(12) United States Patent
Nurminen et al.

(10) Patent No.: US 11,442,136 B2
(45) Date of Patent: Sep. 13, 2022

(54) COLLECTING OR TRIGGERING COLLECTING POSITIONING DATA FOR UPDATING AND/OR GENERATING A POSITIONING MAP

(71) Applicant: HERE Global B.V., Eindhoven (NL)

(72) Inventors: Henri Jaakko Julius Nurminen, Tampere (FI); Pavel Ivanov, Tampere (FI); Lauri Aarne Johannes Wirola, Tampere (FI)

(73) Assignee: HERE Global B.V., Eindhoven (NL)

( * ) Notice: Subject to any disclaimer, the term of this patent is extended or adjusted under 35 U.S.C. 154(b) by 0 days.

(21) Appl. No.: 17/058,600

(22) PCT Filed: May 30, 2018

(86) PCT No.: PCT/EP2018/064269
§ 371 (c)(1),
(2) Date: Nov. 24, 2020

(87) PCT Pub. No.: WO2019/228630
PCT Pub. Date: Dec. 5, 2019

(65) Prior Publication Data
US 2021/0141049 A1    May 13, 2021

(51) Int. Cl.
*H04L 67/12*        (2022.01)
*G01S 5/02*         (2010.01)

(52) U.S. Cl.
CPC .............................. *G01S 5/02526* (2020.05)

(58) Field of Classification Search
CPC ...... G01S 5/02526; H04L 67/12; H04L 67/00
(Continued)

(56) References Cited

U.S. PATENT DOCUMENTS 8,818,353 B2   8/2014   Kuppusamy
8,972,357 B2   3/2015   Shim et al.
(Continued)

FOREIGN PATENT DOCUMENTS

CN        109154827 A   *   1/2019   ........... G05D 1/0272

OTHER PUBLICATIONS

International Search Report and Written Opinion for PCT/EP2018/064269 dated Mar. 19, 2019 (11 pages).

*Primary Examiner* — Harry K Liu
(74) *Attorney, Agent, or Firm* — Alston & Bird LLP

(57) ABSTRACT

A method and apparatus are disclosed with the method including obtaining positioning data collection condition information representing positioning data collection condition(s) for collecting positioning data for updating and/or generating a positioning map. The method includes obtaining or holding available historical sensor information representing behavioral and/or environmental pattern(s) that were detected by sensor(s) of a mobile device and determining mapping information representing, for each behavioral and/or environmental pattern, whether or not at least one positioning data collection condition was met. The method also includes obtaining current sensor information representing a behavioral and/or environmental pattern that is currently detected by the sensor(s) and determining, at least partially based on the current sensor information and the mapping information, whether positioning data should be collected. If it is determined that positioning data should be collected, the method includes collecting positioning data by the mobile device for updating and/or generating the positioning map.

20 Claims, 4 Drawing Sheets

(58) Field of Classification Search
USPC .......................................................... 342/451
See application file for complete search history.

(56) References Cited

U.S. PATENT DOCUMENTS

| | | |
|---|---|---|
| 9,143,920 B2 | 9/2015 | Do et al. |
| 9,395,190 B1 | 7/2016 | Young et al. |
| 9,503,858 B2 | 11/2016 | Palanki et al. |
| 10,866,102 B2 * | 12/2020 | Holz .................... G05D 1/0272 |
| 2011/0191052 A1 | 8/2011 | Lin et al. |
| 2013/0110454 A1 | 5/2013 | Sidhu et al. |
| 2016/0003972 A1 | 1/2016 | Angermann et al. |
| 2016/0205219 A1 | 7/2016 | Wang et al. |
| 2016/0371394 A1 | 12/2016 | Shahidi et al. |
| 2017/0372223 A1 | 12/2017 | Vaughn et al. |
| 2018/0087909 A1 | 3/2018 | Do et al. |
| 2018/0091946 A1 | 3/2018 | Venkatraman et al. |
| 2019/0126930 A1 * | 5/2019 | Kim ...................... B60W 40/06 |
| 2021/0370516 A1 * | 12/2021 | Maity ................. B25J 11/0005 |

* cited by examiner

COLLECTING OR TRIGGERING COLLECTING POSITIONING DATA FOR UPDATING AND/OR GENERATING A POSITIONING MAP

CROSS-REFERENCE TO RELATED APPLICATIONS

This application is a national phase entry of International Application No. PCT/EP2018/064269, filed May 30, 2018, the entire contents of which are incorporated herein by reference.

FIELD OF THE DISCLOSURE

The invention relates to the field of positioning and more specifically to collecting or triggering collecting positioning data for updating and/or generating a positioning map.

BACKGROUND

Satellite signal based positioning technologies, which are mainly used outdoors, are usually not suited to deliver a satisfactory performance when used for indoor positioning, since satellite signals of global navigation satellite systems (GNSS), like the global positioning system (GPS) or the Galileo system, do not penetrate through walls and roofs strongly enough for an adequate signal reception indoors. Thus, these positioning technologies are not able to deliver a performance indoors that would enable seamless, equal and accurate navigation experience outdoors and indoors.

Therefore, several dedicated solutions for indoor and outdoor positioning have been developed and commercially deployed during the past years. Examples comprise solutions that are based on pseudolites, which are ground based GPS-like short-range beacons, ultra-sound positioning solutions, Bluetooth low energy (BLE) based positioning solutions, cellular network based positioning solutions and wireless local area network (WLAN) based positioning solutions.

A Bluetooth based positioning solution such as a self-contained positioning system, for instance, may be divided in at least three stages, an installation stage, a training stage and a positioning stage.

In the installation stage, Bluetooth beacons are installed in the environment for which a positioning solution is to be provided.

In the subsequent training stage, positioning data are collected. The data may be collected in the form of radio fingerprint observation reports that are based on measurements by mobile devices. A radio fingerprint observation report may indicate a position estimate and measurements taken from the radio interface. The position estimate may be for example GNSS based, sensor-based, or manually inputted. Measurements taken from the radio interface may comprise, by way of example, measured radio signal strengths and an identifier of Bluetooth beacons transmitting the radio signals. The training may be a continuous background process, in which mobile devices of a large number of consumers are continuously reporting collected fingerprint observation reports to a server. Consumers may consent to a participation in such a radio fingerprint observation report collection, if their device is equipped with the needed functionality. This approach is also referred to as crowd-sourcing. Since crow-sourcing is a background process that does not directly benefit the device user, it is desirable that the crowd-sourcing process only consumes limited resources of the device.

Alternatively or in addition, mobile devices may be used for collecting radio fingerprint observation reports in a systematic manner. Collected fingerprint data may be uploaded to a database in a positioning server or in a positioning cloud, where algorithms may be run to generate radio coverage area models of Bluetooth beacons and/or positioning maps for positioning purposes.

In the positioning stage, a mobile device may estimate its current position based on own measurements taken from the radio interface and on the data or a subset of data that is available from the training stage. Coverage area model data or positioning map data that has been generated in the training stage may be transferred to mobile devices by a positioning server via the Internet as assistance data for use in position determinations. Alternatively, coverage area model data and/or positioning map data may be stored in a positioning server to which the mobile devices may connect to via the Internet for obtaining a position estimate.

A similar approach could be used for a positioning that is based on other types of terrestrial transmitters or on a combination of different types of terrestrial transmitters.

SUMMARY OF SOME EMBODIMENTS OF THE INVENTION

It is inter-alia an object of the present invention to improve the above described implementation.

According to an exemplary aspect of the invention, a method is disclosed, wherein the method comprises:

obtaining or holding available positioning data collection condition information representing one or more positioning data collection conditions for collecting positioning data for updating and/or generating a positioning map;

obtaining or holding available historical sensor information representing one or more behavioral and/or environmental patterns that were detected by one or more sensors of a mobile device;

determining or holding available mapping information representing, for each of the behavioral and/or environmental patterns, whether or not at least one of the one or more positioning data collection conditions was met after the respective behavioral and/or environmental pattern had been detected by the sensors of the mobile device;

obtaining current sensor information representing a behavioral and/or environmental pattern that is currently detected by the one or more sensors of the mobile device;

determining, at least partially based on the current sensor information and the mapping information, whether positioning data should be collected by the mobile device for updating and/or generating the positioning map;

if it is determined that positioning data should be collected by the mobile device for updating and/or generating the positioning map, collecting or triggering collecting positioning data by the mobile device for updating and/or generating the positioning map.

The disclosed method may be performed by an apparatus such as the mobile device or a positioning server (e.g. which is at least partially responsible for updating and/or generating the positioning map). Alternatively, the disclosed method may be performed by a system such as a positioning system comprising the mobile device and the positioning server. Therein, the mobile device may be any one embodiment of the below disclosed mobile device(s), the positioning server may be any one embodiment of the below disclosed positioning server(s) and the positioning system may be any one of the below disclosed positioning system (s).

Examples for a mobile device may be a smartphone, a tablet computer, a notebook computer, a smart watch and a smart band.

The positioning server may at least partially serve for generating and/or updating the positioning map. The positioning server may be part of a positioning system. In certain exemplary embodiments of the invention, the positioning server may be part of a server cloud (e.g. which comprises a plurality of servers) or may be represented by a server cloud (e.g. which comprises a plurality of servers).

The positioning map may be configured to enable the mobile device (e.g. a plurality of mobile devices comprising the mobile device) to estimate their position at least partially based on this positioning map when the mobile device is located in an environment represented by the positioning map. For example, the positioning map is represented by positioning map information which may be transmitted from a positioning server to the mobile device or which may be hold available by the mobile device.

The positioning map may be a radio coverage map of the environment (e.g. an indoor environment) represented by the positioning map that is generated and/or updated based on positioning data (e.g. radio fingerprint observation reports) as disclosed above. Therein, a radio coverage map of the environment may be understood to represent at least the expected radio coverage of one or more radio nodes that are installed in the environment. For example, the positioning map may represent a respective radio coverage model for each of these one or more radio nodes that are installed in the environment represented by the positioning map. The radio coverage model of such a radio node may describe the area (e.g. the area of the environment) within which a radio signal transmitted or triggered to be transmitted by this radio node is expected to be observable (e.g. receivable with a minimum quality). The real radio coverage of such a radio node may however deviate from the expected radio coverage as described by such a radio coverage model.

A radio coverage model of a radio node may be a hard-boundary model or a soft-boundary model (e.g. a hard-boundary model or a soft-boundary model describing expected radio coverage).

An example for a soft-boundary radio coverage model for a respective radio node may be a parametric radio model. Parameters of such a parametric radio model may be considered to be parameters which enable determination of one or more characteristics of one or more radio signals (e.g. radio positioning support signals) transmitted or triggered to be transmitted by the respective radio node that are expected to be observable at different positions. For example, parameters of such a parametric radio model may represent radio transmission parameters of the parametric radio model. Using radio transmission parameters of the parametric radio model may have the effect that the required amount of information for defining the one or more characteristics of one or more radio signals may be particularly small. An example of a parametric radio model is a path loss model for radio signals (e.g. radio positioning support signals) transmitted or triggered to be transmitted by the respective radio node.

An example for a hard-boundary radio coverage model for a respective radio node may be a geometric model. Information of such a geometric radio model may be considered to be information which (e.g. geometrically) describe (e.g. define) an expected radio coverage of the respective radio node.

By receiving one or more of radio signals of one or more radio nodes that are installed in the environment represented by the positioning map and/or by evaluating (e.g. measuring) such one or more radio signals, the mobile device may for example determine (e.g. estimate) its position when it is located in this environment by additionally using information representing such an positioning map representing radio coverage area models for these one or more radio nodes.

The positioning map is for example a positioning map of a positioning system for a predetermined environment. For example, the disclosed method is performed in the training stage of the positioning system for this predetermined environment. The positioning system may be a self-contained positioning system.

In certain exemplary embodiments of the invention, the predetermined environment may be a predetermined indoor environment. Accordingly, the positioning server may be an indoor positioning server of an indoor positioning system for this predetermined indoor environment. For example, the indoor environment is inside a building or a complex of buildings like a shopping center, a parking garage, an airport, a company site, etc.

In this specification, information may be understood to mean information in encoded form, for example information in the form of data or a signal.

Holding available information may be understood to mean that the information (e.g. information in the form of data) is stored in memory means, for example memory means of the apparatus holding available the information. Information could be obtained by receiving the information (e.g. information in the form of a signal), for example by communication means of the apparatus obtaining the information, or by capturing the information, for example by a sensor or user input means (e.g. a user input sensor) of an apparatus obtaining the information.

Accordingly, the positioning data collection condition information may be hold available by being stored in memory means of the apparatus or the system performing the disclosed method (e.g. the mobile device or the positioning server or the positioning system). Alternatively or additionally, the positioning data collection condition information may be obtained by receiving the information (e.g. by communication means of the apparatus or the system performing the disclosed method) or by capturing (e.g. by a sensor or user input means of the apparatus or the system performing the disclosed method) the information.

The positioning data collection conditions for collecting positioning data for updating and/or generating the positioning map may be predetermined and may describe conditions under which positioning data should be collected by the mobile device for updating and/or generating the positioning map. For example, the positioning data collection conditions may specify that positioning data should be collected by the mobile device for updating and/or generating the positioning map if the mobile device enters or exits or is located in an environment for which further positioning data need to be collected to generate or update the positioning map. For example, the positioning map or the section of the positioning map for this environment may be not available (e.g. no positioning data have been collected yet during the training stage) or incomplete (e.g. less than a predetermined number of positioning data have been collected during the training stage and/or the expected positioning accuracy is less than a predetermined positioning accuracy) or (e.g. potentially) outdated (e.g. the environment may have changed). To this end, at least one positioning data collection condition may specify that positioning data should be collected by the mobile device for updating and/or generating the positioning map if the mobile device enters or exits or is located in such an environment for which the positioning map is not available or incomplete or (e.g. potentially) outdated. Accordingly, this positioning data collection condition may be understood to be met if it is determined that the mobile device enters or exits or is located in an environment for which the positioning map is not available or incomplete or (e.g. potentially) outdated. For example, it may be determined that the mobile device is located in an such an environment if positioning data captured by a positioning sensor (e.g. a GNSS positioning sensor) of the mobile device indicate that the mobile device has entered or is located in such an environment.

Alternatively or additionally, the positioning data collection conditions may specify that positioning data should be collected by the mobile device for updating and/or generating the positioning map if the mobile device may enter or exit or be located in an environment which is crucial for enabling positioning based on the positioning map like a GNSS-blocked environment or an environment associated with intensive positioning data collection or an environment associated with a high density of radio nodes. To this end, at least one positioning data collection condition may specify that positioning data should be collected by the mobile device if the mobile device potentially enters or exits such an environment (e.g. a GNSS-blocked environment like an indoor environment). Accordingly, this positioning data collection condition may be understood to be met if it is determined that the mobile device enters or exits or is located in such an environment (e.g. a GNSS-blocked environment like an indoor environment). For example, it may be determined that the mobile device is located in a GNSS-blocked area if a GNSS positioning sensor of the mobile device fails to obtain sufficient GNSS positioning signals for determining a position of the mobile device.

For example, each of the positioning data collection conditions may be associated with a priority (e.g. by a respective weighting coefficient represented by the positioning data collection condition information as disclosed below) indicating the importance of collecting positioning data if the respective positioning data collection condition is met.

The historical sensor information may be hold available by being stored in memory means of the apparatus or the system performing the disclosed method (e.g. the mobile device or the positioning server or the positioning system). Alternatively or additionally, the historical sensor information may be obtained by receiving the information (e.g. by communication means of the apparatus or the system performing the disclosed method) or by capturing (e.g. by the sensors of the mobile device) the information.

For example, the historical sensor information may represent one or more behavioral and/or environmental patterns that were detected by the one or more sensors of the mobile device in the past (e.g. since the initial operation or the last reset of the mobile device) or during a learning phase (e.g. In a specified time period in the past like in the last 10 days or in the last 5 days).

Therein, a behavioral and/or environmental pattern may be understood to describe a value of (e.g. a value range of) at least one parameter captured by at least one sensor of the mobile device and/or a change in at least one parameter captured by at least one sensor of the mobile device, preferably a value of (e.g. a value range of) and/or a change in at least two different parameters captured by at least two different sensors of the mobile device. Such a value of (e.g. a value range of and/or change in at least one parameter captured by at least one sensor of the mobile device may be considered to be characteristic for a specific behavior of the user of the mobile device and/or for a specific environment of the mobile device. For example, a change in environment volume captured by an acoustic sensor (e.g. a microphone) of the mobile device may be considered to be characteristic for entering or exiting a (crowded) Indoor environment. Similarly, a change in vertical acceleration captured by an acceleration sensor of the mobile device may be considered to be characteristic for using an elevator of an indoor environment. A speed of the mobile device in the range of 3 km/h to 6 km/h captured by a speed sensor may be considered to be characteristic for walking.

The one or more behavioral and/or environmental patterns may be predetermined. Alternatively or additionally, the one or more behavioral and/or environmental patterns may be learned by the mobile device (e.g. in the past or during the learning phase), for example by use of an algorithm configured to identify behavioral and/or environmental patterns from values of and/or changes in at least one parameter (e.g. repeatedly) captured by at least one sensor of the mobile device like a machine learning algorithm. For example, the one or more sensors of the mobile device may be configured to (e.g. permanently or regularly) scan for such (e.g. predetermined or learned) behavioral and/or environmental patterns. In this example, a specific (e.g. predetermined or learned) behavioral and/or environmental pattern may be understood to be detected by the one or more sensors of the mobile device if a characteristic value of and/or change in at least one parameter as described by the specific predetermined or learned behavioral and/or environmental pattern is captured by at least one sensor of the mobile device.

If a specific (e.g. predetermined or learned) behavioral and/or environmental pattern is detected by the one or more sensors of the mobile device, sensor information representing the specific behavioral and/or environmental pattern (e.g. by representing an identifier of the specific behavioral and/or environmental pattern and/or one or more parameters captured by the one or more sensors) may be obtained.

For example, the current sensor information representing the behavioral and/or environmental pattern that is currently detected by the one or more sensors of the mobile device may be understood to represent the specific behavioral and/or environmental pattern that was detected last or recently (e.g. within a predetermined time period, e.g. within the last 5 minutes, or 1 minute, or 30 seconds) by the one or more sensors of the mobile device. The current sensor information is for example not part of the historical sensor information.

The mapping information may be hold available by being stored in memory means of the apparatus or the system performing the disclosed method (e.g. the mobile device or the positioning server or the positioning system). Alternatively or additionally, the mapping information may be determined by determining, for each of the behavioral and/or environmental patterns represented by the historical sensor information, whether or not at least one of the one or more positioning data collection conditions was met after the respective behavioral and/or environmental pattern had been detected by the one or more sensors of the mobile device (e.g. in the past or during the learning phase). For example, the mapping information may be obtained as a result of this determining.

Accordingly, the mapping information may represent, for each of the behavioral and/or environmental patterns represented by the historical sensor information, whether or not at least one of the one or more positioning data collection conditions was met after the respective behavioral and/or environmental pattern had been detected by the one or more sensors of the mobile device in the past or during the learning phase.

That at least one of the one or more positioning data collection conditions was met after the respective behavioral and/or environmental pattern had been detected by the one or more sensors of the mobile device may be understood to mean that the at least one of the one or more positioning data collection conditions was met within a predetermined time period (e.g. 5 minutes, or 1 minute, or 30 seconds) after the respective behavioral and/or environmental pattern had been detected by the one or more sensors of the mobile device.

That the determining whether positioning data should be collected by the mobile device for updating and/or generating the positioning map is at least partially based on the current sensor information and the mapping information may be understood to mean that the behavioral and/or environmental pattern represented by the current sensor information is to be considered, together with the information represented by the mapping information whether or not one or more positioning data collection conditions were met after this behavioral and/or environmental pattern had been detected (e.g. in the past or during the learning phase), when determining whether positioning data should be collected by the mobile device for updating and/or generating the positioning map, for example by determining (e.g. computing) a probability for collecting positioning data for updating and/or generating the positioning map.

For example, the determining whether positioning data should be collected by the mobile device for updating and/or generating the positioning map may be performed according to predetermined rules or a predetermined algorithm or a combination thereof.

If it is determined that positioning data should be collected by the mobile device for updating and/or generating the positioning map, positioning data for updating and/or generating the positioning map are collected by the mobile device or triggered to be collected by the mobile device. This may be understood to mean that the positioning data for updating and/or generating the positioning map are only collected by the mobile device or only triggered to be collected by the mobile device, if it is determined that positioning data should be collected by the mobile device for updating and/or generating the positioning map.

Triggering collecting positioning data by the mobile device may be understood to mean that the mobile device is caused to collect the positioning data. For example, positioning server may cause the mobile device to collect the positioning data (e.g. by transmitting according control information to the mobile device).

The invention may thus allow situationally determining whether or not positioning data should be collected by the mobile device. It can for example be avoided that the mobile device permanently collects positioning data such that the usage of resources for collecting positioning data is limited.

Moreover, the invention may have the effect that the mobile device starts to collect positioning data for updating and/or generating the positioning map before the positioning data collection condition is met, but when it is likely that the positioning data collection condition will be met. This is for example advantageous over prior art implementations where the collection of positioning data is started when it is determined that the positioning data collection condition is met, because often it is already too late to start collecting data when it is determined that the positioning data collection condition is met. For example, when the device determines that it is located in an indoor environment for which further positioning data need to be collected to generate or update the positioning map, it may be too late to start collecting positioning data, because it is already impossible to get a GNSS-based initial position for sensor-based indoor positioning.

According to a further exemplary aspect of the invention, an apparatus is disclosed, wherein the apparatus comprises means for performing the steps of any one embodiment of the disclosed method or a part thereof (e.g. at least some steps of any one embodiment of the disclosed method).

The means of the disclosed apparatus can be implemented in hardware and/or software. They may comprise for instance a processor for executing computer program code for realizing the required functions, a memory storing the program code, or both. Alternatively, they could comprise for instance circuitry that is designed to realize the required functions, for instance implemented in a chipset or a chip, like an integrated circuit. The disclosed apparatus may comprise a single means for all functions, a common plurality of means for all functions, or a plurality of different means for different functions.

According to a further exemplary aspect of the invention, an apparatus is disclosed, wherein the apparatus comprises at least one processor and at least one memory containing computer program code, the at least one memory and the computer program code with the at least one processor configured to cause the apparatus at least to perform any one embodiment of the disclosed method (e.g. the steps of any one embodiment of the disclosed method) or a part thereof (e.g. at least some steps of any one embodiment of the disclosed method).

For example, the disclosed apparatus(es) may be modules or components for a device, for example chips. Alternatively, the disclosed apparatus(es) may be devices. In particular, the disclosed apparatus(es) may be the mobile device and/or the positioning server.

As disclosed above, examples for the mobile device may be a smartphone, a tablet computer, a notebook computer, a smart watch and a smart band.

The positioning server may at least partially serve for generating and/or updating the positioning map. The positioning server may be part of a positioning system. In certain exemplary embodiments of the invention, the positioning server may be part of a server cloud which comprises a plurality of servers or may be represented by a server cloud which comprises a plurality of servers.

It is to be understood that the disclosed apparatus(es) may comprise only the disclosed components (e.g. means) or may further comprise one or more additional components (e.g. means). Examples of such additional components are a communication interface, a network interface, a radio interface (e.g. a receiver, a transmitter and/or a transceiver), a data interface, a user interface (e.g. a touch-sensitive display, a keyboard, a touchpad, a display, etc.), a sensor, etc.

According to a further exemplary aspect of the invention, a system is disclosed which comprises the mobile device and the positioning server.

The system may be positioning system for performing any one embodiment of the disclosed method. For example, the mobile device and the positioning server may be configured to cooperate to perform any one embodiment of the disclosed method (e.g. some steps of any one embodiment of the disclosed method may be performed by the mobile device and the other steps may be performed by the positioning server).

For example, the mobile device and the positioning server of the disclosed system may comprise means for performing the steps of any one embodiment of the disclosed method by cooperating (e.g. some steps of any one embodiment of the disclosed method may be performed by means of the mobile device and the other steps may be performed by means of the positioning server). Therein, these means can be implemented in hardware and/or software like the means of the above disclosed apparatus(es).

Alternatively or additionally, each of the mobile devices and the positioning server of the disclosed system may comprise at least one processor and at least one memory containing computer program code. Therein, the computer program code contained (e.g. stored) in the memories of the mobile device and the positioning server may be configured to cause the mobile device and the positioning server to cooperate to at least to perform any one embodiment of the disclosed method.

According to a further exemplary aspect of the invention, a non-transitory computer readable storage medium is disclosed, in which computer program code is stored. The computer program code causes an apparatus or system to perform any one embodiment of the disclosed method (e.g. the steps of any one embodiment of the disclosed method) when executed by a processor or by a plurality of processors. The computer program code could be stored in the computer readable storage medium in the form of instructions encoding the computer-readable storage medium. The computer readable storage medium may be intended for taking part in the operation of a device, like an internal or external hard disk of a computer, or be intended for distribution of the program code, like an optical disc.

According to a further exemplary aspect of the invention, a computer program code is disclosed, the computer program code when executed by a processor (or by a plurality of processors) causing an apparatus or system to perform any one embodiment of the disclosed method (e.g. the steps of any one embodiment of the disclosed method).

The disclosed method, apparatus(es), system, non-transitory computer readable storage medium and computer program code may be for collecting or triggering collecting positioning data for updating and/or generating the positioning map.

In the following, further features and embodiments of these exemplary aspects of the invention will be described.

According to an exemplary embodiment of the invention, the mapping information represents, for each (e.g. possible) combination of the behavioral and/or environmental patterns represented by the historical sensor information and the positioning data collection conditions represented by the positioning data collection condition information, a respective probability that the respective positioning data collection condition was met after the respective behavioral and/or environmental pattern had been detected by the sensors of the mobile device (e.g. in the past or during the learning phase). It is to be understood that the determining whether positioning data should be collected by the mobile device for updating and/or generating the positioning map may be at least partially based on these probabilities for the combinations of the behavioral and/or environmental patterns represented by the historical sensor information and the positioning data collection conditions represented by the positioning data collection condition information.

For example, the probability for such a specific combination (i.e. a combination of a specific behavioral and/or environmental pattern represented by the historical sensor information and a specific positioning data collection condition represented by the positioning data collection condition information) may be defined or determined by dividing the number indicating how often the specific positioning data collection condition was met after the specific behavioral and/or environmental pattern had been detected by the sensors (e.g. in the past or during the learning phase) by the number indicating how often the specific behavioral and/or environmental pattern was detected by the sensors (e.g. in the past or during the learning phase). Accordingly, the mapping information may represent the result of this division as probability for the combination of the specific behavioral and/or environmental pattern represented by the historical sensor information and the specific positioning data collection condition.

The mapping information may thus be considered as an indication for the likelihood that a specific behavioral and/or environmental pattern may be followed by a specific positioning data collection condition.

According to an exemplary embodiment of the invention, the historical sensor information represents, for each of the behavioral and/or environmental patterns, a respective frequency with which the respective behavioral and/or environmental pattern was detected by the sensors of the mobile device (e.g. In the past or during the learning phase). It is to be understood that the determining whether positioning data should be collected by the mobile device for updating and/or generating the positioning map may be at least partially based on these frequencies for the behavioral and/or environmental patterns represented by the historical sensor information.

The frequency with which a specific behavioral and/or environmental pattern was detected by the sensors of the mobile device (e.g. in the past or during the learning phase) may for example be the absolute frequency or the relative frequency or a frequency per predetermined time period (e.g. per day or per hour) with which a specific behavioral and/or environmental pattern was detected by the sensors of the mobile device (e.g. in the past or during the learning phase).

The absolute frequency of a specific behavioral and/or environmental pattern may be the number indicating how often the specific behavioral and/or environmental pattern was detected in the past (e.g. since the initial operation or the last reset of the mobile device) or during the learning phase (e.g. in a specified time period in the past like in the last 10 days or in the last 5 days). The relative frequency of a specific behavioral and/or environmental pattern may be the number indicating how often the specific behavioral and/or environmental pattern was detected in the past or during the learning phase divided by the total number indicating how often all behavioral and/or environmental patterns were detected in the past (e.g. since the initial operation or the last reset of the mobile device) or during the learning phase (e.g. in a specified time period in the past like in the last 10 days or in the last 5 days). The frequency per predetermined time period of a specific behavioral and/or environmental pattern may be the number indicating how often the specific behavioral and/or environmental pattern was detected in the past or during the learning phase divided by the number of (e.g. subsequent) predetermined time periods (e.g. the number of subsequent days or hours) lapsed in the past (e.g. since the initial operation or the last reset of the mobile device) or during the learning phase (e.g. In a specified time period in the past like in the last 10 days or in the last 5 days).

The historical sensor information may thus be considered as an indication for the likelihood that a specific behavioral and/or environmental pattern may occur.

According to an exemplary embodiment of the invention, the positioning data collection condition information represents, for each of the positioning data collection conditions, a respective weighting coefficient. The weighting coefficients for the positioning data collection conditions may for example represent a prioritization of the positioning data collection conditions. It is to be understood that the determining whether positioning data should be collected by the mobile device for updating and/or generating the positioning map may be at least partially based on these weighting coefficients represented by the positioning data collection condition information.

According to an exemplary embodiment of the invention, the determining whether positioning data should be collected by the mobile device for updating and/or generating the positioning map comprises:
  determining a probability for collecting positioning data for updating and/or generating the positioning map.

For example, the probability for collecting positioning data for updating and/or generating the positioning map may be determined (e.g. computed) at least partially based on one or more of the above disclosed (1) probabilities for the combinations of the behavioral and/or environmental patterns and the positioning data collection conditions, (2) frequencies for the behavioral and/or environmental patterns and (3) weighting coefficients for the positioning data collection conditions.

For example, the probability for collecting positioning data for updating and/or generating the positioning map may be computed based on the following formula:

$$\mathbb{P}_j = \frac{\Sigma_i \omega_i \cdot p_{i|j}}{\Sigma_i \omega_i (p_{i|j} + \Sigma_{k \neq j} p_{i|k} f_k)}$$

Therein, the positioning data collection conditions are indexed with i and the weighting conditions for the positioning data collections are denoted with $\omega_i$; the specific behavioral and/or environmental pattern for which the probability $\mathbb{P}_j$ is computed is indexed with J; the other behavioral and/or environmental patterns are indexed with k≠J and the frequencies per predetermined time period of these behavioral and/or environmental patterns are denoted $f_k$; the probabilities for the combinations of the behavioral and/or environmental patterns are denoted $p_{i|j}$, wherein $p_{i|j}$ expresses the probability with which the i-th positioning data collection condition was met after the J-th behavioral and/or environmental pattern had been detected by the sensors of the mobile device.

With this formula, the probability $\mathbb{P}_j$ for collecting positioning data for updating and/or generating the positioning map, which is determined (e.g. computed) for the J-th behavioral and/or environmental pattern currently detected and, thus, represented by the current sensor information, is proportional to the expected importance or priority $\Sigma_i \omega_i \cdot p_{i|j}$. However, if the probability of detecting any other behavioral and/or environmental pattern in combination with a positioning data collection condition during the same predetermined time period ($p_{i|k} f_k$ for the k-th behavioral and/or environmental pattern and the i-th positioning data collection condition based on basic probability calculus) and the expected importances given by the other behavioral and/or environmental patterns $\Sigma_i \omega_i \cdot p_{i|k} \cdot f_k$ increase, the probability $\mathbb{P}_j$ for collecting positioning data for updating and/or generating the positioning map decreases. This may have the effect that the positioning data are not collected or that collecting the positioning data is not triggered if it is probable that one or more even more important or higher prioritized positioning data collection conditions will be met within the same time period.

For example, the determining whether positioning data should be collected by the mobile device for updating and/or generating the positioning map further comprises:
  generating a random or a pseudo-random number having a value between zero and one, wherein, if the random or pseudo-random number is less or equal the probability for collecting positioning data for updating and/or generating the positioning map, it is determined that positioning data should be collected by the mobile device for updating and/or generating the positioning map.

This may allow to probabilistically determine whether or not positioning data should be collected by the mobile device for updating and/or generating the positioning map in response to the behavioral or environmental pattern represented by the current sensor information. For example, this may be done as follows: After determining (e.g. computing) $\mathbb{P}_j$ as disclosed above, a pseudo-random number u is generated from a continuous uniform distribution between 0 for and 1. If u≤$\mathbb{P}_j$ (or, alternatively, if u<$\mathbb{P}_j$), it is determined that positioning data should be collected by the mobile device for updating and/or generating the positioning map. Otherwise, it may be determined that that positioning data should not be collected by the mobile device for updating and/or generating the positioning map.

According to an exemplary embodiment of the invention, the sensors of the mobile device detecting the one or more behavioral and/or environmental patterns consist of or comprise one or more (e.g. at least one, or more preferably at least two, or even more preferably at least three) non-positioning and/or non-radio sensors.

Examples for such non-positioning and/or non-radio sensors are:
  an inertial sensor like an acceleration sensor, a speed or velocity sensor, a gyroscope, a magnetometer, a barometer, a proximity sensor, etc.
  an acoustic sensor,
  an optical sensor,
  a temperature sensor,
  an user input sensor,
  a clock.

An acceleration sensor or a speed or velocity sensor of the mobile device may for example be configured to capture a speed and/or a change of speed of the mobile device which may be considered to be characteristic for a speed and/or a change of speed of the mobile device and the user of the mobile device. Such a speed or change of speed of the mobile device may for example be a behavioral or environmental pattern that is detectable by an acceleration sensor or a speed or velocity sensor. For example, a characteristic change of speed may be detected when the user of the mobile device arrives at an indoor environment by car and will soon enter the indoor environment. Moreover, a change in vertical acceleration or in vertical speed captured by such an acceleration sensor or by such a speed or velocity sensor of the mobile device may be considered to be characteristic for using an elevator of an indoor environment.

As disclosed above, an acoustic sensor (e.g. a microphone) of the mobile device may for example be configured to capture a change in environment volume which may be considered to be characteristic for entering or exiting a (crowded) indoor environment. Similarly, an optical sensor (e.g. a light sensitive sensor or a camera) may be configured to capture a change in environment lightning or a temperature sensor may capture a change in environment temperature which may be considered to be characteristic for entering or exiting an indoor environment.

A user input sensor may for example be configured to capture that a user of the mobile device launches a certain application associated with a specific environment (e.g. an airport/hospital/office building's application).

A clock may provide the current time which may for example be considered, alone or in combination with a change in at least one further parameter captured by at least one further sensor of the mobile device, to be characteristic for a specific behavior of the user of the mobile device and/or for a specific environment of the mobile device. The current time may be understood to time of day or time of week, for example.

Typically, the use of such non-radio and/or non-positioning sensors is associated with less resource (e.g. energy) consumption than the use of radio and/or positioning sensors. Therefore, the use of such non-radio and/or non-positioning sensors helps to limit the use of resources for detecting the one or more behavioral and/or environmental patterns. Moreover, inertial sensors are for example often continually used for another purpose, for example on request of (e.g. user) applications like activity tracker applications. Sensor information that have been captured for another purpose are freely and/or inexpensively available for detecting behavioral and/or environmental patterns and, thus, also help to limit the use of resources for detecting the one or more behavioral and/or environmental patterns.

According to an exemplary embodiment of the invention, the sensors of the mobile device detecting the one or more behavioral and/or environmental patterns comprise one or more positioning and/or radio sensors.

An example for such a positioning sensor is a GNSS sensor like a sensor for the global positioning system (GPS) and/or the Galileo system. Such a positioning sensor may be configured to capture the current position (e.g. the current GNSS position) of the mobile device which may for example be considered, alone or in combination with a value of and/or a change in at least one further parameter captured by at least one further non-positioning and/or non-radio sensor of the mobile device, to be characteristic for a specific behavior of the user of the mobile device and/or for a specific environment of the mobile device. For example, the current position of the mobile device may indicate that the mobile device is in or close to an environment where a positioning data collection condition was frequently met (e.g. In the past or during the learning phase) or that the mobile device is located in or close to an environment associated with intensive positioning data collection.

The current position of the mobile device may be understood to be the last position captured by the positioning sensor. For example, the current position may not be captured by the positioning sensor for the purpose of detecting a behavioral or environmental pattern, but the last position captured by the positioning sensor (e.g. on request of the user or an (e.g. user) application of the mobile device) may be used, alone or in combination with a change in at least one further parameter captured by at least one further non-positioning and/or non-radio sensor of the mobile device, for the purpose of detecting a behavioral or environmental pattern. This may have the effect that no or only limited resources are used for detecting a behavioral or environmental pattern.

An example for such a radio sensor is a radio interface (e.g. a receiver, a transmitter and/or a transceiver). Such a radio sensor may be configured to capture radio signals that are observable at the current position of the mobile device which may for example be considered, alone or in combination with a change in at least one further parameter captured by at least one further non-positioning and/or non-radio sensor of the mobile device, to be characteristic for a specific behavior of the user of the mobile device and/or for a specific environment of the mobile device. For example, the radio signals that are observable at the current position of the mobile device may indicate that the mobile device is close to one or more radio nodes which are located in or close to an environment where a positioning data collection condition was frequently met (e.g. In the past or during the learning phase) or that the mobile device is located in or dose to an environment associated with a high density of radio nodes.

The radio signals that are observable at the current position of the mobile device may be understood to be the last radio signals captured by the radio sensor. For example, the radio signals may not be captured by the positioning sensor for the purpose of detecting a behavioral or environmental pattern, but the last radio signals captured by the radio sensor (e.g. on request of the user or an (e.g. user) application of the mobile device) may be used, alone or in combination with a change in at least one further parameter captured by at least one further non-positioning and/or non-radio sensor of the mobile device, for the purpose of detecting a behavioral or environmental pattern. This may have the effect that no or only limited resources are used for detecting a behavioral or environmental pattern.

According to an exemplary embodiment of the invention, the positioning data collection condition information represents at least one of the following conditions:
  the mobile device enters a GNSS-blocked environment;
  the mobile device exits an GNSS-blocked environment;
  the mobile device is located in an environment associated with intensive positioning data collection;
  the mobile device is located in an environment associated with a high density of radio nodes;
  the mobile device is located in an environment for which further positioning for updating and/or generating the positioning map should be collected.

Whether or not a positioning data collection condition is met may be determined (e.g. in the past or during the learning phase) based on sensor information (e.g. sensor information representing one or more parameters captured by one or more sensors of the mobile device like positioning and/or radio sensors).

For example it may be determined that the mobile device is located in an GNSS-blocked area if a GNSS positioning sensor of the mobile device falls to capture a GNSS position (e.g. to obtain sufficient GNSS signals for determining a GNSS position).

An environment associated with intensive positioning data collection or an environment for which further positioning for updating and/or generating the positioning map should be collected may be labelled accordingly in the positioning map. Accordingly, it may be determined that the mobile device is located in such an environment when the current position (e.g. captured by a positioning sensor or determined by use of the positioning map) of the mobile device indicates that the mobile device is located in an environment labelled in the positioning map as environment associated with intensive positioning data collection or as environment for which further positioning for updating and/or generating the positioning map should be collected.

Moreover, an environment associated with a high density of radio nodes may be understood to be an environment in which more than a predetermined threshold number of radio signals from different radio nodes are observable. When a radio sensor of the mobile device captures more than such a predetermined threshold number of radio signals from different radio nodes at the current location of the mobile device, it may thus be determined that the mobile device is located in an environment associated with a high density of radio nodes.

According to an exemplary embodiment of the invention, the positioning data for updating and/or generating the positioning map are at least partially collected by the mobile device by collecting radio fingerprint observation reports.

Collecting radio fingerprint observation reports by the mobile device may be understood to mean that the mobile device generates the radio fingerprint observation reports at least partially based on scanning results. For example, collecting such a radio fingerprint observation report by the mobile device may comprise scanning for radio signals observable at an observation position (e.g. the current position) of the mobile device and generating a radio fingerprint observation report containing an indication for the radio nodes from which a radio signal is observable at the observation position of the mobile device and an indication of the observation position of the mobile device. A radio signal may be understood to be observable at an observation position of the mobile device if the radio signal is receivable with a minimum quality (e.g. a minimum signal-to-noise ratio and/or a minimum signal power) at this position by the mobile device.

For example, each of the radio fingerprint observation reports indicates a respective observation position and one or more respective radio nodes from which radio signals are observable at the respective observation position by the mobile device.

As disclosed above, collecting radio fingerprint observation reports by the mobile device may be understood to mean that the mobile device generates the radio fingerprint observation reports at least partially based on scanning results. For example, collecting such a radio fingerprint observation report by the mobile device may comprise scanning for radio signals observable at an observation position of the mobile device and generating a radio fingerprint observation report containing an indication for the radio nodes from which a radio signal is observable at the observation position of the mobile device and an indication of the observation position of the mobile device.

Optionally, the mobile device (e.g. a radio interface of the mobile device) may determine (e.g. measure) receiving parameters like a received signal strength of the radio signals observable at the observation position when scanning for radio signals. The radio fingerprint observation report may then indicate these receiving parameters (e.g. measured received signal strengths for the radio signals observable at the observation position).

The observation position may for example be determined based on user input and/or based on the positioning map and/or based on information enabling determination of the observation position (e.g. sensor information captured by one or more sensors of the mobile device). Each of the radio fingerprint observation reports may contain an indication of the respective observation position at which the mobile device scanned for radio signals and an indication of the one or more respective radio nodes from which radio signals were observable by the mobile device when scanning for radio signals at the respective observation position.

An indication of a position may be understood to be a representation of the position (e.g. in the form of positioning and/or geographic coordinates). Alternatively or additionally, an indication of a position may be understood to represent information enabling determination of the position (e.g. sensor information captured by one or more sensors). An example of an indication for a radio node may be an identifier of the radio node like a name, an address (e.g. a MAC address or an IP address), an universally unique identifier (UUID), a service set identifier (SSID), a basic service set identifier (BSSID), or a combination thereof.

For example, the one or more radio nodes indicated by a radio fingerprint observation report may be at least partially part of the above disclosed system (e.g. a positioning system). In particular, the system may comprise a plurality of such radio nodes (e.g. all of the one or more radio nodes).

At least one radio node of the one or more radio nodes indicated by a radio fingerprint observation report (e.g. one or more radio nodes which are part of the above disclosed system) may be one of:
- a Bluetooth beacon;
- a Bluetooth beacon enabling Bluetooth low energy (BLE) mode;
- a Bluetooth low energy (BLE) beacon;
- a wireless local area network (WLAN) access point and/or router; and
- cellular network node.

The beacons may comprise a Bluetooth and/or BLE radio interface, which includes at least a Bluetooth and/or BLE transmitter. The Bluetooth and/or BLE transmitter may also be a part of a Bluetooth and/or BLE transceiver. The Bluetooth and/or BLE radio interface may be configured to transmit Bluetooth and or BLE radio signals.

Such beacons can be easily installed at various installation positions and require little to no maintenance. For example, a plurality of beacons may be easily distributed across a certain area and may cover a certain area (e.g. the area of the environment represented by the positioning map and/or of the above disclosed system) with radio signals transmitted (e.g. broadcasted) by the beacons. Also, Bluetooth technologies are supported by many mobile devices by default such as most smartphones, most tablet computers, most notebook computers, most smart watches and most smart bands, etc. Using Bluetooth beacons and/or BLE beacons may thus have the effect that the many mobile devices may use the positioning map (e.g. positioning map of the above disclosed system) without any adaptation of hardware. As a result, the approach may be globally scalable and have low maintenance and deployment costs. In addition, regarding positioning utilizing received signal strength (RSS) the end-user experience may be acceptable with these technologies, since a horizontal positioning accuracy of 2 to 3 meters as well as a high reliability in floor detection may be achieved. The beacons may be stand-alone devices or be integrated into or attached to some other device. Bluetooth beacons, in particular in low energy mode, require comparably little energy and the use of Bluetooth low energy may enable a positioning with limited energy consumption at all involved devices.

A Bluetooth beacon that is employed for the invention may be any kind of Bluetooth beacon complying with any present or future standard. The Bluetooth standards are specified by the Bluetooth Special Interest Group and are presently available under https://www.bluetooth.com/.

It is to be understood, however, that other types of radio nodes than variations of Bluetooth beacons may be used as well, for instance tags or other devices that are configured to transmit ultra-wideband (UWB) signals or any wireless radio signals that might emerge in the future.

For example, one or more radio nodes of the one or more radio nodes indicated by a radio fingerprint observation (e.g. one or more radio nodes which are part of the above disclosed system) may be an access point and/or a router of a WLAN. Such an access point and/or router of a WLAN may comprise a WLAN radio interface, which for example includes a WLAN transceiver. The WLAN radio interface may be configured to transmit and/or receive WLAN radio signals. Accordingly, the radio signal transmitted by such an access point and/or router of a WLAN may be a WLAN radio signal. WLAN is for example specified by the standards of the IEEE 802.11 family (http://www.ieee.org/).

Alternatively or additionally, the one or more radio nodes of the one or more radio nodes indicated by a radio fingerprint observation (e.g. one or more radio nodes which are part of the above disclosed system) may be cellular network nodes. Such cellular network nodes may be a base transceiver station (BTS) or a node-B of a cellular network like a 2G/3G/4G/5G cellular communication network. A cellular network node may comprise a cellular radio interface, which for example includes a 2G/3G/4G/5G transceiver. Accordingly, the radio signal transmitted by such cellular network node may be a 2G/3G/4G/5G cellular radio signal. The 2G/3G/4G/5G cellular radio communication standards are developed by the 3GPP and presently available under http://www.3gpp.org/.

Moreover, it is to be understood that the invention is not limited to collecting radio fingerprint observation reports as positioning data. Alternatively or additionally, magnetic fingerprint reports (e.g. containing an indication for a direction, strength and/or relative change of a magnetic field observable at an observation position of the mobile device and an indication of the observation position of the mobile device), voice fingerprint reports (e.g. containing an indication for an environment volume observable at an observation position of the mobile device and an indication of the observation position of the mobile device), odor or scent fingerprint reports (e.g. containing an indication for an odor or scent (e.g. by indicating a chemical parameter that is characteristic for an odor or scent like a concentration) observable at an observation position of the mobile device and an indication of the observation position of the mobile device) and/or various geographical data may be collected as positioning data to give some non-limiting examples.

According to an exemplary embodiment of the invention, the method comprising:
updating and/or generating or triggering updating and/or generating the positioning map at least partially based on the collected positioning data for updating and/or generating the positioning map.

According to an exemplary embodiment of the invention, the method is performed by the mobile device or by a positioning server or by a positioning system comprising the mobile device and the positioning server. Optionally, the positioning system may comprise one or more radio nodes as disclosed above.

According to an exemplary embodiment of the invention, the mobile device may be part of a plurality of mobile devices. Each mobile device of the plurality of mobile devices may collect positioning data for updating and/or generating the positioning map. Therein, collecting the positioning data by the plurality of mobile devices may be performed according to the above disclosed method. For example, each mobile device of the plurality of mobile devices may at least partially perform the above disclosed method. Alternatively or additionally, the positioning server may at least partially perform the above disclosed method for triggering collecting the positioning data by the plurality of mobile devices.

The features and example embodiments of the invention described above may equally pertain to the different aspects according to the present invention.

It is to be understood that the presentation of the invention in this section is merely by way of examples and non-limiting.

Other features of the invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not drawn to scale and that they are merely intended to conceptually illustrate the structures and procedures described herein.

DETAILED DESCRIPTION OF THE FIGURES

The following description serves to deepen the understanding of the present invention and shall be understood to complement and be read together with the description of example embodiments of the invention as provided in the above SUMMARY section of this specification.

Figure 1A:
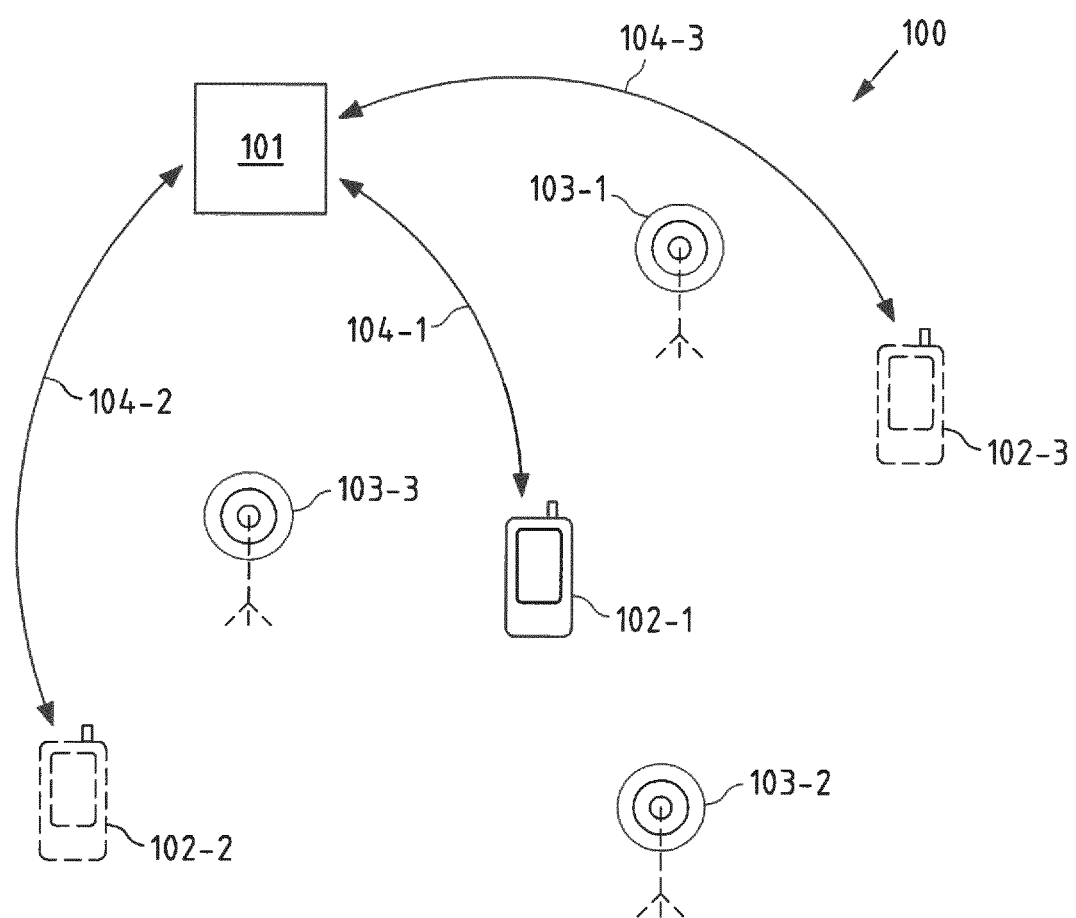
FIG. 1a is a block diagram of an exemplary embodiment of a system according to the invention.

FIG. 1a is a schematic high-level block diagram of a system 100 according to an exemplary aspect of the invention. In the following, it is assumed that system 100 is an indoor radio positioning system for an indoor environment.

The indoor environment is for example inside a building or a complex of buildings like a shopping center, a parking garage, an airport, a company site, etc.

System 100 comprises an indoor radio positioning server 101 and a mobile device 102-1. Optionally, system 100 may further comprise mobile devices 102-2 and 102-3 (i.e. a plurality of mobile devices 102-1 to 102-3) and a plurality of radio nodes 103-1 to 103-3. It is to be understood that system 100 may comprise further mobile devices and radio nodes. In the following, it is thus referred to mobile devices 102-1 to 102-3 and radio nodes 103-1 to 103-3 without limiting the scope of the invention.

For example, each of mobile devices 102-1 to 102-3 may be one of a smartphone, a tablet computer, a notebook computer, a smart watch and a smart band.

It is to be understood that indoor radio positioning system 100 is not limited to a single indoor radio positioning server 101, but may optionally comprise a plurality of servers (e.g. forming a server cloud). Accordingly, the indoor radio positioning server may be part of such a plurality of servers (e.g. a server cloud) or may be represented by such a plurality of servers (e.g. a server cloud).

Radio nodes 103-1 to 103-3 may be fixedly installed in the indoor environment and may be configured to transmit (e.g. broadcast) radio signals. Such a radio signal transmitted by a respective one of radio nodes 103-1 to 103-3 may contain and/or represent positioning support information. The positioning support information are for example configured to enable mobile devices 102-1 to 102-3 receiving the radio signals to estimate their position at least partially based on these positioning support information. For example, the positioning support information may at least represent an identifier of the respective one of radio nodes 103-1 to 103-3 transmitting the radio signal containing this positioning support information. As disclosed above, examples for an identifier of a radio node are a name, an address (e.g. a MAC address or an IP address), an universally unique identifier (UUID), a service set identifier (SSID), a basic service set identifier (BSSID), or a combination thereof.

For example, one or more of radio nodes 103-1 to 103-3 may be a BLE beacon which is configured to automatically and repeatedly transmit BLE radio signals containing positioning support information like an advertisement signal containing and/or representing an UUID of the BLE beacon transmitting the advertisement signal. Alternatively or additionally, one or more of radio nodes 103-1 to 103-3 may be a WLAN access point and/or router which is configured to automatically and repeatedly transmit WLAN radio signals containing positioning support information like a periodically transmitted beacon signal containing and/or representing an SSID of the WLAN of the WLAN access point and/or router transmitting the beacon signal.

In system 100, indoor radio positioning server 101 and mobile devices 102-1 to 102-3 may be configured to communicate with each other as indicated by communication paths 104-1, 104-2 and 104-3, respectively. It is to be understood that communication paths 104-1 to 104-3 may comprise one or more communication links (e.g. one or more wireless communication links or one or more wireline communication links or a combination thereof). Communication paths 104-1 to 104-3 are for example communication paths over a cellular communication system like a 2G/3G/4G/5G cellular communication system. The 2G/3G/4G/5G cellular radio communication standards are developed by the 3GPP and presently available under http://www.3gpp.org/.

Moreover, Indoor radio positioning server 101 may be configured for generating and/or updating an indoor radio positioning map for the indoor environment. For example, the indoor radio positioning map is configured to enable each of the mobile devices 102-1 to 102-3 to estimate its position at least partially based on this indoor radio positioning map when the respective mobile device is located in the indoor environment. For example, the indoor radio positioning map is represented by indoor radio positioning map information which may be transmitted from the indoor radio positioning server 101 to the mobile devices 102-1 to 102-3.

The indoor radio positioning map may be a radio coverage map of the indoor environment which represents at least the expected radio coverage of the radio nodes 103-1 to 103-3 that are installed in the indoor environment. The radio coverage model of such a radio node may describe the area (e.g. the area of the indoor environment) within which a radio signal transmitted or triggered to be transmitted by this radio node is expected to be observable (e.g. receivable with a minimum quality). The real radio coverage of such a radio node may however deviate from the expected radio coverage as described by such a radio coverage model. As disclosed in more detail above, a radio coverage model of a radio node may be a hard-boundary model or a soft-boundary model (e.g. a hard-boundary model or a soft-boundary model describing expected radio coverage).

The indoor radio positioning server 101 may be configured for transmitting indoor radio positioning map information representing the indoor radio positioning map to the mobile devices 102-1 to 102-3 (e.g. via the communication paths 104-1, 104-2 and 104-3, respectively). The mobile devices 102-1 to 102-3 may then use this indoor radio positioning map information for estimating their position based on radio signals received from the radio nodes 103-1 to 103-2 when they are located in the indoor environment.

Mobile devices 102-1 to 102-3 may be configured for collecting radio fingerprint observation reports for updating and/or generating the indoor radio positioning map for the indoor environment and for transmitting the collected radio fingerprint observation reports to the indoor radio positioning server 101 (e.g. via the communication paths 104-1, 104-2 and 104-3, respectively). The indoor radio positioning server 101 may use these radio fingerprint observation reports for generating and/or updating the indoor radio positioning map.

However, collecting radio fingerprint observation reports for updating and/or generating the indoor radio positioning map is a background process that does not directly benefit the users of mobile devices 102-1 to 102-3. To enhance acceptance of this background process by the users, it is thus desirable to limit and/or reduce the usage of resources (e.g. energy consumption for scanning for radio signals, energy consumption for capturing a GNSS position, memory for storing positioning data for updating and/or generating a positioning map, and energy consumption and network bandwidth for data transmission of collected positioning data) of the mobile devices 102-1 to 102-3 by this background process. In particular, it is desirable to avoid that the mobile devices 102-1 to 102-3 permanently collect radio fingerprint observation reports and to provide a method like the a method according to the invention (e.g. the method or parts of the method described below with reference to FIG. 2) that allows determining situationally whether or not radio fingerprint observation reports should be collected by the mobile device and when to start collecting radio fingerprint observation reports.

Figure 1B:
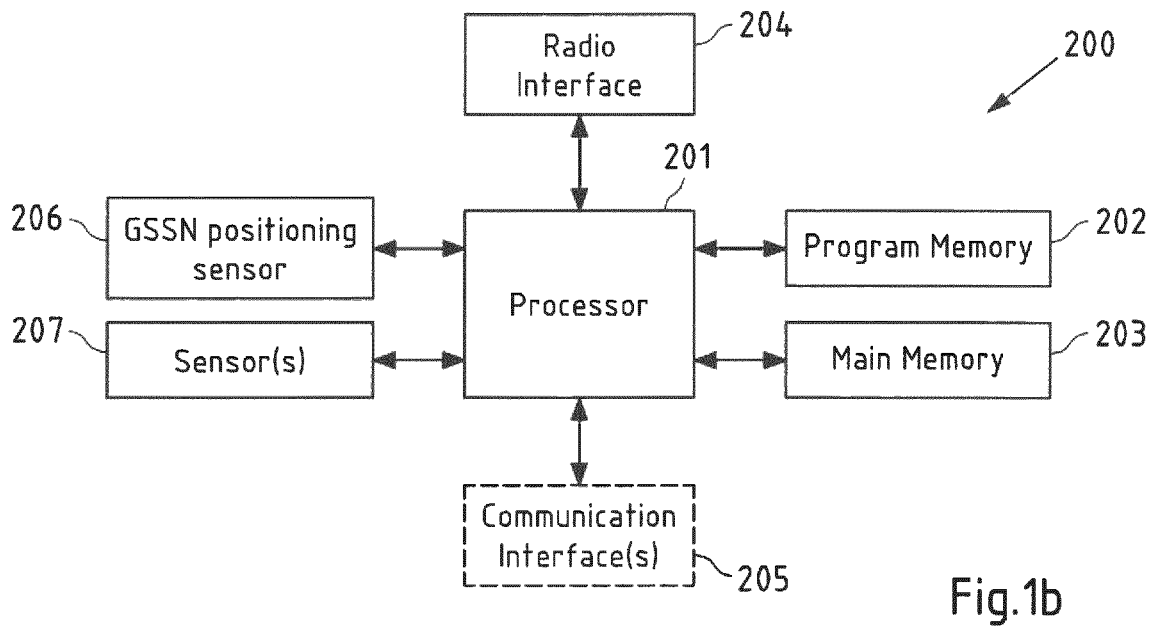
FIG. 1b is a block diagram of an exemplary embodiment of an apparatus according to the invention.

FIG. 1b is a block diagram of an exemplary embodiment of an apparatus in form of a mobile device 200 according to the invention. In the following, it is assumed that mobile device 200 is one of the mobile devices 102-1 to 102-3 of system 100 of FIG. 1a. For example, mobile device 200 may be one of a smartphone, a tablet computer, a notebook computer, a smart watch and a smart band.

Mobile device 200 comprises a processor 201. Processor 201 may represent a single processor or two or more processors, which are for instance at least partially coupled, for instance via a bus. Processor 201 executes a program code stored in program memory 202 (for instance program code causing mobile device 200 to perform one or more of the embodiments of a method according to the invention or parts thereof (e.g. the method or parts of the method described below with reference to FIG. 2), when executed on processor 201), and interfaces with a main memory 203.

Program memory 202 may also contain an operating system for processor 201. Some or all of memories 202 and 203 may also be included into processor 201.

One of or both of a main memory and a program memory of a processor (e.g. program memory 202 and main memory 203 and/or program memory 302 and main memory 303 as described below with reference to FIG. 1c) could be fixedly connected to the processor (e.g. processor 201 and/or processor 301) or at least partially removable from the processor, for instance in the form of a memory card or stick.

A program memory (e.g. program memory 202 and/or program memory 302 as described below with reference to FIG. 1c) may for instance be a non-volatile memory. It may for instance be a FLASH memory (or a part thereof), any of a ROM, PROM, EPROM, MRAM or a FeRAM (or a part thereof) or a hard disc (or a part thereof), to name but a few examples. For example, a program memory may for instance comprise a first memory section that is fixedly installed, and a second memory section that is removable from, for instance in the form of a removable SD memory card.

A main memory (e.g. main memory 203 and/or main memory 303 as described below with reference to FIG. 1c) may for instance be a volatile memory. It may for instance be a DRAM memory, to give non-limiting example. It may for instance be used as a working memory for processor 201 when executing an operating system and/or programs.

Processor 201 further controls a radio interface 204 configured to receive and/or output data and/or information. For instance, radio interface 204 may be configured to receive radio signals from a radio node (e.g. one of radio nodes 103-1 to 103-2 of system 100 of FIG. 1a). The radio interface 204 is configured to scan for radio signals that are broadcast by nodes 103-1 to 103-2 of system 100 of FIG. 1a. Furthermore, the radio interface 204 may be configured for evaluating (e.g. taking measurements on the received radio signals like measuring a received signal strength) and/or extracting data or information from the received radio signals. It is to be understood that any computer program code based processing required for receiving and/or evaluating radio signals may be stored in an own memory of radio interface 204 and executed by an own processor of radio interface 204 or it may be stored for example in memory 202 and executed for example by processor 201.

For example, the radio interface 204 may at least comprise a BLE radio interface including at least a BLE receiver (RX). The BLE receiver may be a part of a BLE transceiver. It is to be understood that the invention is not limited to BLE or Bluetooth. For example, radio interface 204 may additionally or alternatively comprise a WLAN radio interface including at least a WLAN receiver (RX). The WLAN receiver may also be a part of a WLAN transceiver.

Moreover, processor 201 controls a communication interface 205 which is for example configured to communicate according to a cellular communication system like a 2G/3G/4G/5G cellular communication system. Mobile device 200 may use communication interface 205 to communicate with indoor radio positioning server 101 of system 100 (e.g. via one of communication paths 104-1 to 104-3).

Furthermore, processor 201 may control a GNSS positioning sensor 206 (e.g. a GPS and/or a Galileo sensor) and one or more non-radio and/or non-positioning sensors 207. GNSS positioning sensor 206 may be configured to capture a position of the mobile device (e.g. a current position of the mobile device) by receiving GNSS satellite signals of a GNSS system (e.g. GPS satellite signals and/or Galileo satellite signals) and determining the position of the mobile device at least partially based on satellite signals of the GNSS system that are receivable at this position.

As disclosed above, examples for the one or more non-positioning and/or non-radio sensors 207 are:
- an inertial sensor like an acceleration sensor, a speed or velocity sensor, a gyroscope, a magnetometer, a barometer, etc.
- an acoustic sensor,
- an optical sensor,
- a temperature sensor,
- a user input sensor (e.g. a user interface like a touch-sensitive display, a keyboard, a touchpad, a display, etc),
- a clock.

The one or more sensors 207 may be configured to detect, alone or in combination with radio interface 204 and/or GNSS positioning sensor 206, one or more behavioral and/or environmental patterns and to capture sensor information representing the detected one or more behavioral and/or environmental patterns. As disclosed in more detail above and below, a behavioral and/or environmental pattern may be understood to describe a characteristic value of and/or change in at least one parameter captured by at least one sensor of the mobile device, preferably a characteristic value of and/or change in at least two different parameters captured by at least two different sensors of the mobile device. For example, the one or more sensors 207 may be configured to (e.g. permanently or regularly) scan for such (e.g. predetermined or learned) behavioral and/or environmental patterns. In this example, a specific (e.g. predetermined or learned) behavioral and/or environmental pattern may be understood to be detected by the one or more sensors 207 of the mobile device if a characteristic value of and/or change in at least one parameter as described by the specific predetermined or learned behavioral and/or environmental pattern is captured by at least one sensor of the mobile device.

The components 202 to 207 of server 100 may for instance be connected with processor 201 by means of one or more serial and/or parallel busses.

It is to be understood that mobile device 200 may comprise various other components.

Figure 1C:
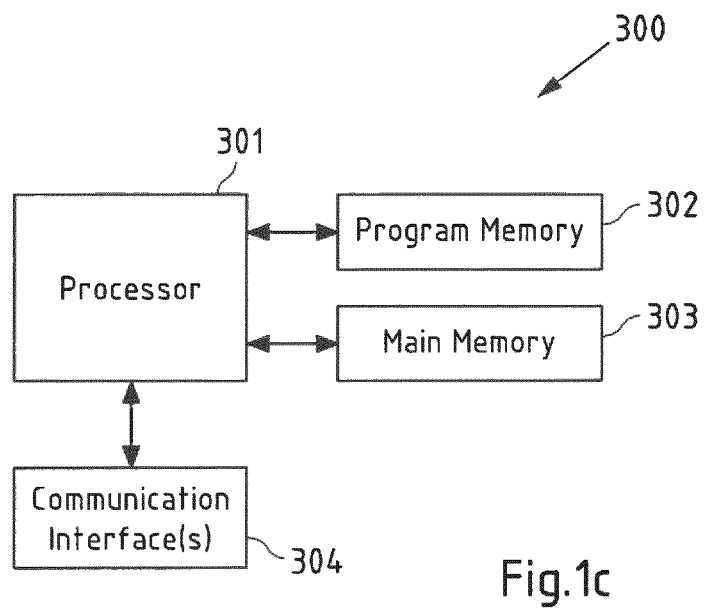
FIG. 1c is a block diagram of another exemplary embodiment of an apparatus according to the invention.

FIG. 1c is a block diagram of an exemplary embodiment of an apparatus in form of an indoor radio positioning server 300 according to the invention. In the following, it is assumed that indoor radio positioning server 300 is indoor radio positioning server 101 of system 100 of FIG. 1a.

Indoor radio positioning server 300 comprises a processor 301. Processor 301 may represent a single processor or two or more processors, which are for instance at least partially coupled, for instance via a bus. Processor 301 executes a program code stored in program memory 302 (for instance program code causing indoor radio positioning server 300 to perform one or more of the embodiments of a method according to the invention or parts thereof (e.g. the method or parts of the method described below with reference to FIG. 2), when executed on processor 301), and interfaces with a main memory 303.

Program memory 302 may also comprise an operating system for processor 301. Some or all of memories 302 and 303 may also be included into processor 301.

Moreover, processor 301 controls a communication interface 304 which is for example configured to communicate according to a cellular communication system like a 2G/3G/4G/5G cellular communication system. Indoor radio positioning server 300 may use communication interface 304 to communicate with mobile devices 102-1 to 102-3 of system 100 (e.g. via one of communication paths 104-1 to 104-3).

The components 302 to 304 of indoor radio positioning server 300 may for instance be connected with processor 301 by means of one or more serial and/or parallel busses.

It is to be understood that indoor radio positioning server 300 may comprise various other components. For example, indoor radio positioning server 300 may optionally comprise a user interface (e.g. a touch-sensitive display, a keyboard, a touchpad, a display, etc).

Figure 2:
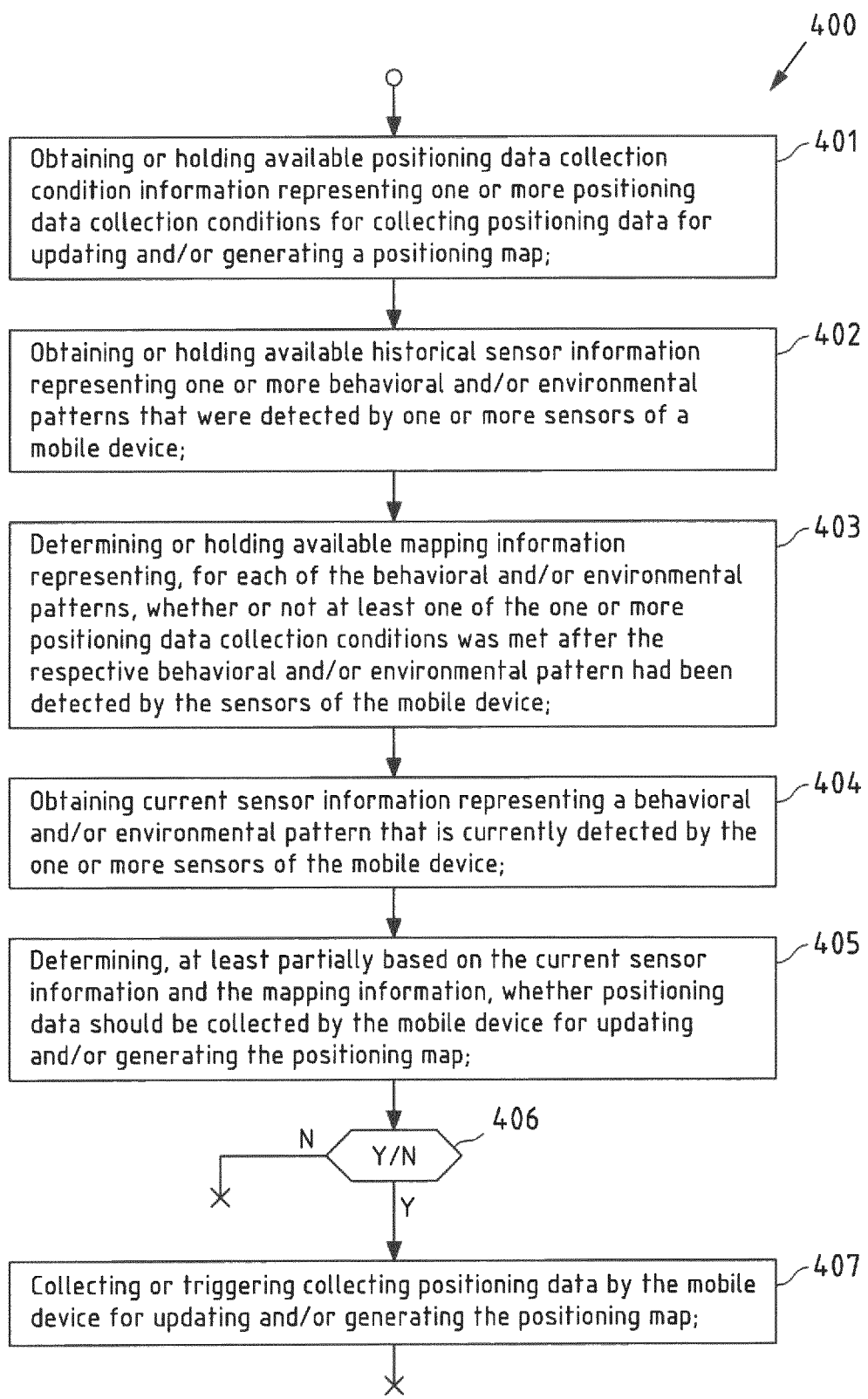
FIG. 2 is a flow chart illustrating an exemplary embodiment of a method according to the invention.

FIG. 2 is a flow chart 400 illustrating an exemplary embodiment of a method according to the invention. Without limiting the scope of the invention, it is assumed in the following that mobile device 102-1 of indoor radio positioning system 100 as described above with respect to FIG. 1*a* performs steps 401 to 407 of flow chart 400.

In a step 401, positioning data collection condition information representing one or more positioning data collection conditions for collecting positioning data for updating and/or generating a positioning map is obtained or hold available by mobile device 102-1. Therein, it is assumed in the following that the positioning map is the indoor radio positioning map for the indoor environment of indoor radio positioning system 100.

For example, mobile device 102-1 may receive the positioning data collection condition information from indoor radio positioning server 101 via communication paths 104-1 by means of communication interface 205 in step 401. Subsequently, mobile device 102-1 may store the positioning data collection condition information in program memory 202.

Optionally, mobile device 102-1 may receive indoor radio positioning map information representing the indoor radio positioning map for the indoor environment of indoor radio positioning system 100 from indoor radio positioning server 101 via communication paths 104-1 by means of communication interface 205 in step 401. Subsequently, mobile device 102-1 may store the indoor radio positioning map information in program memory 20).

For example, the positioning data collection condition information may be part of the indoor radio positioning map information. Alternatively, the positioning data collection condition information may be separate from the indoor radio positioning map information.

The positioning data collection condition information may be or may represent a database or a bank containing the one or more positioning data collection conditions for collecting positioning data for updating and/or generating the indoor radio positioning map.

The positioning data collection conditions for collecting positioning data for updating and/or generating the indoor radio positioning map for the indoor environment of indoor radio positioning system 100 may be predetermined and may describe conditions under which positioning data should be collected by mobile device 102-1 for updating and/or generating the indoor radio positioning map.

For example, the positioning data collection conditions may specify that positioning data should be collected by the mobile device 102-1 for updating and/or generating the indoor radio positioning map if the mobile device 102-1 enters or exits or is located in an environment for which further positioning data need to be collected to generate or update the indoor radio positioning map. To this end, at least one positioning data collection condition may specify that positioning data should be collected by the mobile device 102-1 for updating and/or generating the indoor radio positioning map if the mobile device 102-1 enters or exits or is located in such an environment for which the indoor radio positioning map is not available or incomplete or outdated. Accordingly, this positioning data collection condition may be understood to be met if it is determined that the mobile device 102-1 enters or exits or is located in an environment for which the positioning map is not available or incomplete or outdated. For example it may be determined that the mobile device 102-1 is located in an such an environment if positioning data captured by GNSS positioning sensor 206 of the mobile device 102-1 indicate that the mobile device 102-1 has entered or is located in such an environment.

Alternatively or additionally, the positioning data collection conditions may specify that positioning data should be collected by the mobile device 102-1 for updating and/or generating the indoor radio positioning map for the indoor environment of indoor radio positioning system 100 if the mobile device 102-1 may enter or exit or be located in an environment which is crucial for enabling positioning based on the indoor radio positioning map like a GNSS-blocked environment or an environment associated with intensive positioning data collection or an environment associated with a high density of radio nodes. To this end, at least one positioning data collection condition may specify that positioning data should be collected by the mobile device 102-1 if the mobile device 102-1 potentially enters or exits such an environment (e.g. a GNSS-blocked environment like an indoor environment). Accordingly, this positioning data collection condition may be understood to be met if it is determined that the mobile device enters or exits or is located in such an environment (e.g. a GNSS-blocked environment like an indoor environment). For example it may be determined that the mobile device is located in an GNSS-blocked area if GNSS positioning sensor 206 of the mobile device fails to obtain sufficient GNSS positioning signals for determining the position of mobile device 102-1.

In particular, the positioning data collection condition information may represent at least one of the following conditions:
- mobile device 102-1 enters a GNSS-blocked environment;
- mobile device 102-1 exits an GNSS-blocked environment;
- mobile device 102-1 is located in an environment associated with intensive positioning data collection;
- mobile device 102-1 is located in an environment associated with a high density of radio nodes;
- mobile device 102-1 is located in an environment for which further positioning for updating and/or generating the positioning map should be collected.

Moreover, the positioning data collection condition information may represent a respective weighting coefficient for each of the positioning data collection conditions. Therein, the positioning data collection conditions may be prioritized by the weighting coefficients. For example, a specific weighting coefficient for a specific positioning data collection condition may indicate the importance of collecting positioning data if the specific positioning data collection condition is met. The weighting coefficients may have a value between zero and one.

In the following, it is assumed that the positioning data collection condition information represent three positioning data collection conditions and a respective weighting coefficient for each of the positioning data collection conditions. A representation of this exemplary positioning data collection condition information is shown in the following table, where the positioning data collection conditions are indexed with i and the weighting conditions for the positioning data collections are denoted with col:

| | 1$^{st}$ positioning data collection condition | 2$^{nd}$ positioning data collection condition | 3$^{rd}$ positioning data collection condition |
|---|---|---|---|
| i | 1 | 2 | 3 |
| $\omega_i$ | 0.3 | 0.5 | 0.2 |

It is to be understood that this representation of positioning data collection condition information as shown in the table is exemplary and non-limiting.

In a step 402, historical sensor information representing one or more behavioral and/or environmental patterns that were detected by one or more sensors (e.g. sensors 207) of mobile device 102-1 is obtained or hold available by mobile device 102-1.

As disclosed above, the one or more sensors 207 may be configured to detect, alone or in combination with radio interface 204 and/or GNSS positioning sensor 206, one or more behavioral and/or environmental patterns and to capture sensor information representing the detected one or more behavioral and/or environmental patterns.

For example, the one or more sensors 207 of the mobile device 102-1 may be configured to (e.g. permanently or regularly) scan for (e.g. predetermined or learned) behavioral and/or environmental patterns. Furthermore, sensor information captured by radio interface 204 and/or GNSS positioning sensor 206 for another purpose may for example be freely and/or inexpensively available for detecting behavioral and/or environmental patterns. If a specific (e.g. predetermined or learned) behavioral and/or environmental pattern is detected by the one or more sensors 207, alone or in combination with radio interface 204 and/or GNSS positioning sensor 206, sensor information representing the specific behavioral and/or environmental pattern (e.g. by representing an identifier of the specific behavioral and/or environmental pattern and/or one or more parameters captured by the one or more sensors 207 alone or in combination with radio interface 204 and/or GNSS positioning sensor 206) may be obtained and subsequently stored as or as part of historical sensor information in program memory 202.

In the following, it is assumed that the historical sensor information contains sensor information representing one or more behavioral and/or environmental patterns that were detected by the one or more sensors 207 of the mobile device during a learning phase. Therein, the learning phase is assumed to be the last 10 days. It is to be understood that this configuration is exemplary and non-limiting.

As disclosed above, a behavioral and/or environmental pattern may be understood to describe a value of (e.g. a value range of) and/or a change in at least one parameter captured by at least one sensor of the one or more sensors 207 of mobile device 102-1, preferably a value of (e.g. a value range of) and/or a change in at least two different parameters captured by at least two different sensors of the one or more sensors 207 of mobile device 102-1. Such a value of (e.g. a value range of) and/or change in at least one parameter may be considered to be characteristic for a specific behavior of the user of the mobile device and/or for a specific environment of the mobile device.

The one or more behavioral and/or environmental patterns may be predetermined. Alternatively or additionally, the one or more behavioral and/or environmental patterns may be learned by the mobile device 102-1 during the learning phase (e.g. by use of an algorithm configured to identify behavioral and/or environmental patterns from changes in at least one parameter (e.g. repeatedly) captured by at least one sensor of the mobile device like a machine learning algorithm).

Examples for such (e.g. predetermined or learned) behavioral and/or environmental patterns are:

Speed and/or motion state or change in speed and/or motion state (e.g. captured by an acceleration sensor or speed or velocity sensor of sensors 207). For example, a change of speed and/or motion state from driving a car to walking may indicate that it is likely that the user of the mobile device 102-1 has arrived at an indoor environment by car and will soon enter the indoor environment.

The current time of day or time of week (e.g. provided by a dock) is such that one or more positioning data collection conditions were frequently met at or close to the same time of day or time of week during the learning phase.

Launching a certain application (e.g. captured by a user interface sensor of sensors 207), for example an application for the indoor environment represented by the radio indoor positioning map of indoor radio positioning system 100. This may for example indicate that it is likely the mobile device 102-1 (or the user of the mobile device) is located in or wil soon enter the indoor environment represented by the radio indoor positioning map of indoor radio positioning system 100.

Environmental parameters like environment temperature and/or lighting and/or volume change (e.g. captured by a temperature and/or an optical and/or an acoustical sensor of sensors 207). A (e.g. rapid) change in such environmental parameters may for example indicate that it is likely that the mobile device 102-1 (or the user of the mobile device) enters or exits an indoor environment.

The current position of the mobile device 102-1 (e.g. captured by GNSS sensor 206) indicates that the mobile device 102-1 is in or close to an environment where a positioning data collection condition was frequently met during the learning phase or that the mobile device 102-1 is located in or close to an environment associated with intensive positioning data collection. Therein, the current position may not be captured for the purpose of detecting a behavioral or environmental pattern, but the position may be captured for another purpose (e.g. on request of the user or an (e.g. user) application of the mobile device 102-1) such that the position can also be used (e.g. reused) for detecting a behavioral or environmental pattern. Since no or only very limited additional resources are consumed when the current position of the mobile device 102-1 captured for another purpose is also used (e.g. reused) for detecting a behavioral or environmental pattern, this current position of the mobile device 102-1 may be understood to be obtained inexpensively or for free for detecting a behavioral or environmental pattern.

The radio signals (e.g. captured by radio interface 204) that are observable at the current position of the mobile device 102-1 indicate that the mobile device 102-1 is close to one or more radio nodes which are located in or close to an environment where a positioning data collection condition was frequently met during the learning phase or that the mobile device 102-1 is located in or close to an environment associated with a high density of radio nodes. Therein, the radio signals may not be captured for the purpose of detecting a behavioral or environmental pattern, but the radio signals may be captured for another purpose (e.g. on request of the user or an (e.g. user) application of the mobile device 102-1) such that the radio signals can also be used (e.g. reused) for detecting a behavioral or environmental pattern. Since no or only very limited additional resources are consumed when such radio signals captured for another purpose are also used (e.g. reused) for detecting a behavioral or environmental pattern, these radio signals may be understood to be obtained inexpensively or for free for detecting a behavioral or environmental pattern.

A combination of these behavioral or environmental patterns. For example, the speed and/or motion state (e.g. captured by an acceleration sensor or speed or velocity sensor of sensors 207) is running and the current location (e.g. captured by GNSS positioning sensor 206) is in or close to an environment where a positioning data collection condition was frequently met during the learning phase.

Moreover, the historical sensor information may represent, for each behavioral or environmental pattern, a frequency with which the respective behavioral and/or environmental pattern was detected by the sensors of the mobile device during the learning phase. The frequency with which a specific behavioral and/or environmental pattern was detected by the sensors of the mobile device during the learning phase may for example be the absolute frequency or the relative frequency or the frequency per predetermined time period (e.g. per day or per hour) with which a specific behavioral and/or environmental pattern was detected by the sensors of the mobile device during the learning phase.

In the following, it is assumed that the historical sensor information represent four behavioral or environmental patterns that were detected by the sensors of the mobile device during the learning phase in the last ten days and a respective frequency per day for each of these four behavioral or environmental patterns. The first behavioral or environmental pattern was for example detected every day, the second behavioral or environmental pattern was for example detected on 2 days, the third behavioral or environmental pattern was for example detected on 7 days and the fourth behavioral or environmental pattern was for example detected on 5 days. A representation of this exemplary historical sensor information is shown in the following table, where the behavioral or environmental patterns are indexed with j and the frequencies for the positioning data collections are denoted with $f_j$:

| | 1$^{st}$ behavioral or environmental pattern | 2$^{nd}$ behavioral or environmental pattern | 3$^{rd}$ behavioral or environmental pattern | 4$^{th}$ behavioral or environmental pattern |
|---|---|---|---|---|
| j | 1 | 2 | 3 | 4 |
| $f_j$ | $\frac{10}{10} = 1$ | $\frac{2}{10} = 0.2$ | $\frac{7}{10} = 0.7$ | $\frac{5}{10} = 0.5$ |

It is to be understood that this representation of historical sensor information as shown in the table is exemplary and non-limiting.

In a step 403, mapping information representing, for each of the behavioral and/or environmental patterns, whether or not at least one of the one or more positioning data collection conditions was met after the respective behavioral and/or environmental pattern had been detected by the sensors (e.g. sensors 207) of mobile device 102-1 are hold available and/or determined.

For example, the mapping information may be determined by determining, for each of the behavioral and/or environmental patterns that were detected during the learning phase and that are represented by the historical sensor information obtained or hold available in step 402, whether or not at least one of the one or more positioning data collection conditions (represented by the positioning data collection condition information obtained or hold available in step 401) was met after the respective behavioral and/or environmental pattern had been detected by sensors 207 (e.g. alone or in combination with radio interface 204 and/or GNSS positioning sensor 206) of the mobile device 102-1 during the learning phase. For example, the mapping information may be obtained as a result of this determining. Subsequently, the mapping information may be stored in program memory 202 of mobile device 102-1.

That at least one of the one or more positioning data collection conditions was met after the respective behavioral and/or environmental pattern had been detected may be understood to mean that the at least one of the one or more positioning data collection conditions was met within a predetermined time period (e.g. 5 minutes, or 1 minute, or 30 seconds) after the respective behavioral and/or environmental pattern had been detected.

In the following, it is assumed that the mapping information represents, for each combination of the behavioral and/or environmental patterns represented by the historical sensor information and the positioning data collection conditions, a respective probability that the respective positioning data collection condition was met after the respective behavioral and/or environmental pattern had been detected by the sensors of the mobile during the learning phase.

Considering the above examples, the positioning data collection condition information represents three positioning data collection conditions and the historical sensor information represents four behavioral and/or environmental patterns that were detected during the learning phase in the last 10 days such that there are 12 possible combinations. The following table represents how often the four behavioral and/or environmental pattern were detected during the learning phase and how often the positioning data collection conditions were met after one of the behavioral and/or environmental patterns had been detected. Therein, a detected behavioral and/or environmental pattern and the positioning data collection condition met after this behavioral and/or environmental pattern had been detected are written in the same row. For example, on day 1: the 2$^{nd}$ positioning data collection condition was met after the 1$^{st}$ behavioral and/or environmental patterns had been detected; and the 2$^{nd}$ positioning data collection conditions was met after the 3$^{rd}$ behavioral and/or environmental patterns had been detected.

| | Detected behavioral and/or environmental pattern | Met positioning data collection condition after detecting behavioral and/or environmental pattern |
|---|---|---|
| Day 1 | 1$^{st}$ | 2$^{nd}$ |
|  | 3$^{rd}$ | 2$^{nd}$ |
| Day 2 | 1$^{st}$ | 2$^{nd}$ |
|  | 3$^{rd}$ | 2$^{nd}$ |
| Day 3 | 1$^{st}$ | — |
|  | 2$^{nd}$ | — |

-continued

| | Detected behavioral and/or environmental pattern | Met positioning data collection condition after detecting behavioral and/or environmental pattern |
|---|---|---|
| | $3^{rd}$ | $2^{nd}$ |
| Day 4 | $1^{st}$ | — |
| | $4^{th}$ | $1^{st}$ |
| Day 5 | $1^{st}$ | $2^{nd}$ |
| | $2^{nd}$ | — |
| | $3^{rd}$ | $2^{nd}$ |
| Day 6 | $1^{st}$ | — |
| | $4^{th}$ | — |
| Day 7 | $1^{st}$ | $2^{nd}$ |
| | $3^{rd}$ | $2^{nd}$ |
| Day 8 | $1^{st}$ | — |
| | $3^{rd}$ | $2^{nd}$ |
| | $4^{th}$ | — |
| Day 9 | $1^{st}$ | — |
| | $4^{th}$ | $1^{st}$ |
| Day 10 | $1^{st}$ | $2^{nd}$ |
| | $3^{rd}$ | $2^{nd}$ |
| | $4^{th}$ | $3^{rd}$ |

Accordingly, the probabilities for each of the possible combinations as represented by the mapping information may be represented by the following table, where the positioning data collection conditions are indexed with i, the behavioral or environmental patterns are indexed with J and the probabilities for the combinations are denoted with $p_{i|j}$: (i.e. probability that i-th positioning data collecting condition was met after j-th behavioral or environmental pattern had been detected):

| $p_{i|j}$ | $1^{st}$ behavioral or environmental pattern (j = 1) | $2^{nd}$ behavioral or environmental pattern (j = 2) | $3^{rd}$ behavioral or environmental pattern (j = 3) | $4^{th}$ behavioral or environmental pattern (j = 4) |
|---|---|---|---|---|
| $1^{st}$ positioning data collecting condition (i = 1) | $p_{1|1} = \frac{0}{10} = 0$ | $p_{1|2} = \frac{0}{2} = 0$ | $p_{1|3} = \frac{0}{7} = 0$ | $p_{1|4} = \frac{2}{4} = 0.5$ |
| $2^{nd}$ positioning data collecting condition (i = 2) | $p_{2|1} = \frac{5}{10} = 0.5$ | $p_{2|2} = \frac{0}{2} = 0$ | $p_{2|3} = \frac{7}{7} = 1$ | $p_{2|4} = \frac{0}{4} = 0$ |
| $3^{rd}$ positioning data collecting condition (i = 3) | $p_{3|1} = \frac{0}{10} = 0$ | $p_{3|2} = \frac{0}{2} = 0$ | $p_{3|3} = \frac{0}{7} = 0$ | $p_{3|4} = \frac{1}{4} = 0.25$ |

It is to be understood that this representation of mapping information as shown in the table is exemplary and non-limiting.

Steps 401 to 403 may be part of the learning phase. Accordingly, mapping from detected behavioral or environmental patterns to positioning data collection conditions are learned during the learning phase. The learning takes place based on behavioral or environmental patterns detected by the mobile device 102-1. Nevertheless, it may be considered to be not only device-specific, but also user-specific, because typically a mobile device is only used by a single user. Furthermore, the learning phase may be performed for different users of mobile device 102-1 separately.

When the learning phase is completed, the information (e.g. the historical sensor information or the mapping information) collected and/or learned during the learning phase may be used to predict the likelihood that a positioning data collection condition will be met when a behavioral or environmental pattern is detected. It is to be understood that the learning phase (i.e. steps 401 to 403) may be performed continually by mobile device 102-1. However, the use of resources of mobile device 102-1 may be adjusted. For example, when mobile device 102-1 is used for the first time, default values (e.g. for the above disclosed probabilities and frequencies) may be used. During the learning phase, these default values get adjusted as disclosed above. To facilitate this adjustment, it may be beneficial to use resources of mobile device 102-1 more intensively in the beginning (e.g. during the initial learning phase) and to reduce the use of resources of mobile device 102-1 thereafter.

In a step 404, current sensor information representing a behavioral and/or environmental pattern that is currently detected by the one or more sensors (e.g. sensors 207) the mobile device 102-1 are obtained by mobile device 102-1. For example, the current sensor information representing the behavioral and/or environmental pattern that is currently detected may be understood to represent the specific behavioral and/or environmental pattern that was detected last or recently (e.g. within a predetermined time period, e.g. within the last 5 minutes, or 1 minute, or 30 seconds) by the sensors 207 (e.g. alone or in combination with radio interface 204 and/or GNSS positioning sensor 206) of mobile device 102-1. The current sensor information may not be part of the historical sensor information.

In a step 405, it is determined, at least partially based on the current sensor information obtained in step 404 and the mapping information determined or hold available in step 403, whether positioning data should be collected by mobile device 102-1 for updating and/or generating the indoor radio positioning map for the indoor environment of indoor radio positioning system 100.

In the following, it is assumed that the determining in step 405 whether positioning data should be collected by the mobile device for updating and/or generating the positioning map comprises (1) computing a probability for collecting positioning data for updating and/or generating the indoor radio positioning map and (2) generating a random or a pseudo-random number having a value between zero and one, wherein, if the random or pseudo-random number is less or equal the probability for collecting positioning data for updating and/or generating the positioning map, it is determined that positioning data should be collected by the mobile device for updating and/or generating the positioning map.

The probability for collecting positioning data for updating and/or generating the indoor radio positioning map may be computed at least partially based on the information collected or learned during the learning phase (i.e. In steps 401 to 403 as disclosed above). In particular, the above disclosed (1) probabilities $p_{i|j}$ for the combinations of the behavioral and/or environmental patterns and the positioning data collection conditions, (2) frequencies $f_j$ for the behavioral and/or environmental patterns and (3) weighting coefficients $w_i$ for the positioning data collection conditions may be considered as input values when computing a probability for collecting positioning data for updating and/or generating the indoor radio positioning map. Furthermore, computing the probability for collecting positioning data for updating and/or generating may be a function of the behavioral and/or environmental pattern represented by the current sensor information obtained in step 404. For example, the probability for collecting positioning data for updating and/or generating the indoor radio positioning map may be computed based on the following formula:

$$\mathbb{P}_j = \frac{\Sigma_i \omega_i \cdot p_{i|j}}{\Sigma_i \omega_i (p_{i|j} + \Sigma_{k \neq j} p_{i|k} f_k)}$$

With this formula, the probability $\mathbb{P}_j$ for collecting positioning data for updating and/or generating the positioning map, which is computed for the j-th behavioral and/or environmental pattern currently detected and, thus, represented by the current sensor information, is proportional to the expected importance or priority $\Sigma_i \omega_i \cdot p_{i|j}$. However, if the probability of detecting any other behavioral and/or environmental pattern in combination with a positioning data collection condition during the same predetermined time period ($p_{i|k} f_k$ for the k-th behavioral and/or environmental pattern and the i-th positioning data collection condition based on basic probability calculus) and the expected importances given by the other behavioral and/or environmental patterns $\Sigma_i \omega_i \cdot p_{i|k} \cdot f_k$ increase, the probability $\mathbb{P}_j$ for collecting positioning data for updating and/or generating the positioning map decreases.

Considering the above example values for $p_{i|j}$, $f_j$, $\omega_i$ and when the $3^{rd}$ behavioral and/or environmental pattern (i.e. j=3) is represented by the current sensor information obtained in step 404, the probability for collecting positioning data for updating and/or generating the positioning map is computed as follows:

$$\mathbb{P}_3 = \frac{0.3 \cdot 0 + 0.5 \cdot 1 + 0.2 \cdot 0}{\begin{array}{l} 0.3(0 + 0 \cdot 1 + 0 \cdot 0.2 + 0.5 \cdot 0.5) + \\ 0.5(1 + 0.5 \cdot 1 + 0 \cdot 0.2 + 0 \cdot 0.5) + \\ 0.2(0 + 0 \cdot 1 + 0 \cdot 0.2 + 0.25 \cdot 0.5) \end{array}} = 0.59$$

When the $1^{st}$ behavioral and/or environmental pattern (i.e. j=1) is detected, the probability for collecting positioning data for updating and/or generating the positioning map is $\mathbb{P}_1 = 0.36$. In this regard, it is noted that $\mathbb{P}_1$ is about 61% of $\mathbb{P}_3$ even though the probability that the $2^{nd}$ positioning data collection condition is met when the $1^{st}$ behavioral and/or environmental pattern is detected is only half of probability that the $2^{nd}$ positioning data collection condition is met when the $3^{rd}$ behavioral and/or environmental pattern is detected. This is explained by the fact that even when the $3^{rd}$ behavioral and/or environmental pattern is detected, the $1^{st}$ behavioral and/or environmental pattern is likely to follow at the same day, which makes collecting positioning data less important when the $3^{rd}$ behavioral and/or environmental pattern is detected.

The above disclosed formula contains the approximation that each behavioral and/or environmental pattern is detected once a day and is independent of the time of day. It is to be understood that the invention is not limited to this formula. For example, formulas that consider also multiple detections per day, for example by including specific frequencies per hour and/or by accounting for earlier detections at the same day, may also be used. In particular, this kind of formulas may be necessary when the behavioral and/or environmental pattern depend on time (e.g. time of day). For example, probabilities $f_j$ may be multiplied with the percentage of the current day remaining to take such a time dependency into consideration.

After computing the probability $\mathbb{P}_j$ for collecting positioning data for updating and/or generating the positioning map, a pseudo-random number u may be generated from a continuous uniform distribution between 0 for and 1. If u≤ $\mathbb{P}_j$ (or, alternatively, if u<$\mathbb{P}_j$), it is determined in step 405 that positioning data should be collected by the mobile device for updating and/or generating the positioning map. Otherwise, it may be determined that that positioning data should not be collected by the mobile device for updating and/or generating the positioning map.

If it is determined in step 405 that positioning data should not be collected by the mobile device for updating and/or generating the positioning map, the flow chart is terminated in step 406. Otherwise, if it is determined in step 405 that positioning data should be collected by the mobile device for updating and/or generating the positioning map, the flowchart continues with a step 407.

In step 407, positioning data for updating and/or generating the positioning map are collected by mobile device 102-1, or mobile device 102-1 is triggered to collect positioning data for updating and/or generating the positioning map.

For example, mobile device 102-1 may collect positioning data in step 407 by collecting radio fingerprint observation reports, for example by generating the radio fingerprint observation reports at least partially based on scanning results. For example, collecting a radio fingerprint observation report by mobile device 102-1 may comprise scanning for radio signals observable at an observation position of the mobile device (e.g. by radio interface 204) and generating a radio fingerprint observation report containing an indication for the radio nodes from which a radio signal is observable at the observation position of the mobile device and an indication of the observation position of the mobile device. A radio signal may be understood to be observable at an observation position of the mobile device if the radio signal is receivable with a minimum quality (e.g. a minimum signal-to-noise ratio and/or a minimum signal power) at this position.

Mobile device 102-1 may transmit the collected radio fingerprint observation reports via communication paths 104-1 to indoor radio positioning server 101. The indoor radio positioning server 101 may use the collected radio fingerprint observation reports for updating and/or generating the indoor radio positioning map.

To summarize, the invention inter-alia provides a mechanism for situationally determining whether or not positioning data should be collected by the mobile device. It can thus for example be avoided that mobile device 102-1 permanently collects positioning data such that the usage of resources for collecting positioning data is limited.

Moreover, the invention allows the mobile device 102-1 to start to collect positioning data for updating and/or generating the positioning map before a positioning data collection condition is met, but when it is likely that the positioning data collection condition will be met soon. This is for example advantageous over prior art implementations where the collection of positioning data is started when it is determined that the positioning data collection condition is met, because often it is already too late to start collecting positioning data when the it is determined that the positioning data collection condition is met. For example, when the mobile device 102-1 determines that it is located in an indoor environment for which further positioning data need to be collected to generate or update the positioning map, it may be too late to start collecting positioning data, because it is already impossible to get a GNSS-based initial position for sensor-based indoor positioning. Another example is that positioning data should not always be collected when a less important or less prioritized positioning data collection condition is met or may be met if it is likely that even more important or higher prioritized positioning data collection condition will occur soon. Therein, Inexpensive measurements such as motion state detection (with low-frequency inertial measurements), phone usage data such as used or launched applications, temperature, time, freely available sensor information captured by a radio or positioning sensor, possibly cellular positioning, etc. may be used.

It is to be understood that the orders of the steps 401 to 407 of flowchart 400 is only exemplary and that the steps may also have a different order if possible. Furthermore, it is also possible that two or more steps may be performed in one step.

Figure 3:
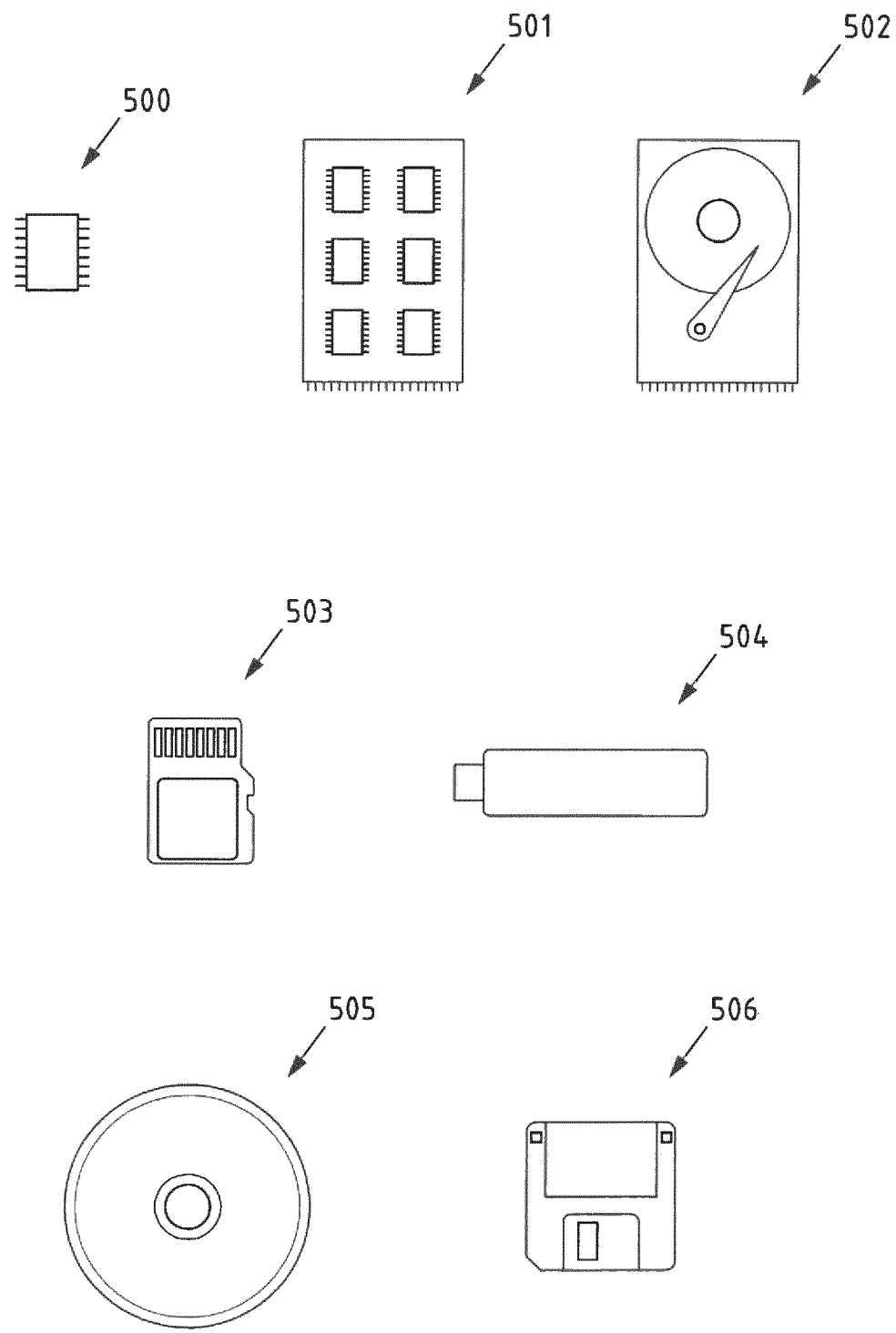
FIG. 3 is a schematic illustration of examples of tangible and non-transitory storage media according to the invention.

FIG. 3 is a schematic illustration of examples of tangible and non-transitory computer-readable storage media according to the present invention that may for instance be used to implement program memory 202 of FIG. 1b or memory 302 of FIG. 1c. To this end, FIG. 3 displays a flash memory 500, which may for instance be soldered or bonded to a printed circuit board, a solid-state drive 501 comprising a plurality of memory chips (e.g. Flash memory chips), a magnetic hard drive 502, a Secure Digital (SD) card 503, a Universal Serial Bus (USB) memory stick 504, an optical storage medium 505 (such as for instance a CD-ROM or DVD) and a magnetic storage medium 506.

Any presented connection in the described embodiments is to be understood in a way that the involved components are operationally coupled. Thus, the connections can be direct or indirect with any number or combination of intervening elements, and there may be merely a functional relationship between the components.

Further, as used in this text, the term 'circuitry' refers to any of the following:

(a) hardware-only circuit implementations (such as implementations in only analog and/or digital circuitry)

(b) combinations of circuits and software (and/or firmware), such as: (i) to a combination of processor(s) or (i) to sections of processor(s)/software (including digital signal processor(s)), software, and memory(ies) that work together to cause an apparatus, such as a mobile phone, to perform various functions) and (c) to circuits, such as a microprocessor(s) or a section of a microprocessor(s), that re-quire software or firmware for operation, even if the software or firmware is not physically present.

This definition of 'circuitry' applies to all uses of this term in this text, including in any claims. As a further example, as used in this text, the term 'circuitry' also covers an implementation of merely a processor (or multiple processors) or section of a processor and its (or their) accompanying software and/or firmware. The term 'circuitry' also covers, for example, a baseband integrated circuit or applications processor integrated circuit for a mobile phone.

Any of the processors mentioned in this text, in particular but not limited to processors 201 and 301 of FIGS. 1b and 1c, could be a processor of any suitable type. Any processor may comprise but is not limited to one or more microprocessors, one or more processor(s) with accompanying digital signal processor(s), one or more processor(s) without accompanying digital signal processor(s), one or more special-purpose computer chips, one or more field-programmable gate arrays (FPGAS), one or more controllers, one or more application-specific integrated circuits (ASICS), or one or more computer(s). The relevant structure/hardware has been programmed in such a way to carry out the described function.

Moreover, any of the actions or steps described or illustrated herein may be implemented using executable instructions in a general-purpose or special-purpose processor and stored on a computer-readable storage medium (e.g., disk, memory, or the like) to be executed by such a processor. References to 'computer-readable storage medium' should be understood to encompass specialized circuits such as FPGAs, ASICs, signal processing devices, and other devices.

The wording "A, or B, or C, or a combination thereof" or "at least one of A, B and C" may be understood to be not exhaustive and to include at least the following: (i) A, or (ii) B, or (iii) C, or (iv) A and B, or (v) A and C, or (vi) B and C, or (vii) A and B and C.

It will be understood that all presented embodiments are only exemplary, and that any feature presented for a particular exemplary embodiment may be used with any aspect of the invention on its own or in combination with any feature presented for the same or another particular exemplary embodiment and/or in combination with any other feature not mentioned. It will further be understood that any feature presented for an example embodiment in a particular category may also be used in a corresponding manner in an example embodiment of any other category.

The invention claimed is:

1. A method, said method comprising:
obtaining or holding available positioning data collection condition information representing one or more positioning data collection conditions for collecting positioning data for updating and/or generating a positioning map;
obtaining or holding available historical sensor information representing one or more behavioral and/or environmental patterns that were detected by one or more sensors of a mobile device;
determining or holding available mapping information representing, for each of said behavioral and/or environmental patterns, whether or not at least one of said one or more positioning data collection conditions was met after said respective behavioral and/or environmental pattern had been detected by said sensors of said mobile device;
obtaining current sensor information representing a behavioral and/or environmental pattern that is currently detected by said one or more sensors of said mobile device;
determining, at least partially based on said current sensor information, said positioning data collection condition information, and said mapping information, whether positioning data should be collected by said mobile device for updating and/or generating the positioning map;

when it is determined that positioning data should not be collected by said mobile device for updating and/or generating the positioning map, not collecting or not triggering collecting of positioning data by said mobile device for updating and/or generating the positioning map; and when it is determined that positioning data should be collected by said mobile device for updating and/or generating the positioning map, collecting or triggering collecting of positioning data by said mobile device for updating and/or generating the positioning map.

2. The method according to claim 1, wherein said mapping information represents, for each combination of said behavioral and/or environmental patterns represented by said historical sensor information and said positioning data collection conditions represented by the positioning data collection condition information, a respective probability that said respective positioning data collection condition was met after said respective behavioral and/or environmental pattern had been detected by said sensors of said mobile device.

3. The method according to claim 1, wherein said historical sensor information represents, for each of said behavioral and/or environmental patterns, a respective frequency with which said respective behavioral and/or environmental pattern was detected by said sensors of said mobile device.

4. The method according to claim 1, wherein said positioning data collection condition information represents, for each of said positioning data collection conditions, a respective weighting coefficient.

5. The method according to claim 1, wherein said determining whether positioning data should be collected by said mobile device for updating and/or generating the positioning map comprises:
determining a probability for collecting positioning data for updating and/or generating the positioning map.

6. The method according to claim 5, wherein said determining whether positioning data should be collected by said mobile device for updating and/or generating the positioning map further comprises:
generating a random or a pseudo-random number having a value between zero and one, wherein, if said random or pseudo-random number is less than or equal to said probability for collecting positioning data for updating and/or generating the positioning map, it is determined that positioning data should be collected by said mobile device for updating and/or generating the positioning map.

7. The method according to claim 1, wherein said sensors of said mobile device detecting said one or more behavioral and/or environmental patterns comprise one or more sensors of the following non-positioning and/or non-radio sensors:
an inertial sensor,
an acoustic sensor,
an optical sensor,
a temperature sensor, or
a user input sensor.

8. The method according to claim 1, wherein said positioning data collection condition information represents at least one of the following conditions:
said mobile device enters a global navigation satellite system (GNSS)-blocked environment;
said mobile device exits a GNSS-blocked environment;
said mobile device is located in an environment associated with intensive positioning data collection;
said mobile device is located in an environment associated with a high density of radio nodes; or
said mobile device is located in an environment for which further positioning for updating and/or generating the positioning map should be collected.

9. The method according to claim 1, wherein said positioning data for updating and/or generating the positioning map are at least partially collected by said mobile device by collecting radio fingerprint observation reports.

10. The method according to claim 9, wherein each of said radio fingerprint observation reports indicates a respective observation position and one or more respective radio nodes from which radio signals are observable at said respective observation position by said mobile device.

11. The method according to claim 10, wherein at least one radio node of said one or more respective radio nodes is one of:
a Bluetooth beacon;
a Bluetooth beacon enabling Bluetooth low energy mode;
a Bluetooth low energy beacon;
wireless local area network access point or router; and
a cellular network node.

12. The method according to claim 1, said method comprising:
updating and/or generating or triggering updating and/or generating said positioning map at least partially based on said collected positioning data for updating and/or generating the positioning map.

13. A non-transitory computer readable storage medium in which computer program code is stored, the computer program code when executed by a processor causing at least one apparatus to perform:
obtaining or holding available positioning data collection condition information representing one or more positioning data collection conditions for collecting positioning data for updating and/or generating a positioning map;
obtaining or holding available historical sensor information representing one or more behavioral and/or environmental patterns that were detected by one or more sensors of a mobile device;
determining or holding available mapping information representing, for each of said behavioral and/or environmental patterns, whether or not at least one of said one or more positioning data collection conditions was met after said respective behavioral and/or environmental pattern had been detected by said sensors of said mobile device;
obtaining current sensor information representing a behavioral and/or environmental pattern that is currently detected by said one or more sensors of said mobile device;
determining, at least partially based on said current sensor information, said positioning data collection condition information, and said mapping information, whether positioning data should be collected by said mobile device for updating and/or generating the positioning map;
when it is determined that positioning data should not be collected by said mobile device for updating and/or generating the positioning map, not collecting or not triggering collecting of positioning data by said mobile device for updating and/or generating the positioning map; and
when it is determined that positioning data should be collected by said mobile device for updating and/or generating the positioning map, collecting or triggering collecting of positioning data by said mobile device for updating and/or generating the positioning map.

14. The computer readable storage medium according to claim 13, wherein said mapping information represents, for each combination of said behavioral and/or environmental patterns represented by said historical sensor information and said positioning data collection conditions represented by the positioning data collection condition information, a respective probability that said respective positioning data collection condition was met after said respective behavioral and/or environmental pattern had been detected by said sensors of said mobile device.

15. An apparatus comprising at least one processor and at least one memory containing computer program code, the at least one memory and the computer program code configured to, with the at least one processor, cause said apparatus at least to:
- obtain or hold available positioning data collection condition information representing one or more positioning data collection conditions for collecting positioning data for updating and/or generating a positioning map;
- obtain or hold available historical sensor information representing one or more behavioral and/or environmental patterns that were detected by one or more sensors of a mobile device;
- determine or hold available mapping information representing, for each of said behavioral and/or environmental patterns, whether or not at least one of said one or more positioning data collection conditions was met after said respective behavioral and/or environmental pattern had been detected by said sensors of said mobile device;
- obtain current sensor information representing a behavioral and/or environmental pattern that is currently detected by said one or more sensors of said mobile device;
- determine, at least partially based on said current sensor information, said positioning data collection condition information, and said mapping information, whether positioning data should be collected by said mobile device for updating and/or generating the positioning map;
- when it is determined that positioning data should not be collected by said mobile device for updating and/or generating the positioning map, not collecting or not triggering collecting of positioning data by said mobile device for updating and/or generating the positioning map; and
- when it is determined that positioning data should be collected by said mobile device for updating and/or generating the positioning map, collect or trigger collecting of positioning data by said mobile device for updating and/or generating the positioning map.

16. The apparatus according to claim 15, wherein said mapping information represents, for each combination of said behavioral and/or environmental patterns represented by said historical sensor information and said positioning data collection conditions represented by the positioning data collection condition information, a respective probability that said respective positioning data collection condition was met after said respective behavioral and/or environmental pattern had been detected by said sensors of said mobile device.

17. The apparatus according to claim 15, wherein said historical sensor information represents, for each of said behavioral and/or environmental patterns, a respective frequency with which said respective behavioral and/or environmental pattern was detected by said sensors of said mobile device.

18. The apparatus according to claim 15, wherein said positioning data collection condition information represents, for each of said positioning data collection conditions, a respective weighting coefficient.

19. The apparatus according to claim 15, wherein the at least one memory and the computer program code are configured to, with the at least one processor, cause said apparatus to determine whether positioning data should be collected by said mobile device for updating and/or generating the positioning map by determining a probability for collecting positioning data for updating and/or generating the positioning map.

20. The apparatus according to claim 19, wherein the at least one memory and the computer program code are configured to, with the at least one processor, cause said apparatus to determine whether positioning data should be collected by said mobile device for updating and/or generating the positioning map by:
- generating a random or a pseudo-random number having a value between zero and one, wherein, if said random or pseudo-random number is less than or equal to said probability for collecting positioning data for updating and/or generating the positioning map, it is determined that positioning data should be collected by said mobile device for updating and/or generating the positioning map.

* * * * *